(12) United States Patent
Seo et al.

(10) Patent No.: US 10,775,067 B2
(45) Date of Patent: Sep. 15, 2020

(54) METHOD FOR CONTROLLING ACTIVATION OF AIR CONDITIONING DEVICE AND APPARATUS THEREFOR

(71) Applicant: Samsung Electronics Co., Ltd., Suwon-si, Gyeonggi-do (KR)

(72) Inventors: Sungmok Seo, Suwon-si (KR); Gunhyuk Park, Seongnam-si (KR); Kwanwoo Song, Yongin-si (KR); Jeongil Seo, Seoul (KR); Jehyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 15/571,686

(22) PCT Filed: May 16, 2016

(86) PCT No.: PCT/KR2016/005177
§ 371 (c)(1),
(2) Date: Nov. 3, 2017

(87) PCT Pub. No.: WO2016/186417
PCT Pub. Date: Nov. 24, 2016

(65) Prior Publication Data
US 2018/0142914 A1    May 24, 2018

(30) Foreign Application Priority Data

May 15, 2015  (KR) .................. 10-2015-0068281
Dec. 22, 2015  (KR) .................. 10-2015-0183458

(51) Int. Cl.
*F24F 11/63*  (2018.01)
*F24F 11/46*  (2018.01)
(Continued)

(52) U.S. Cl.
CPC .......... *F24F 11/63* (2018.01); *F24F 11/0001* (2013.01); *F24F 11/46* (2018.01);
(Continued)

(58) Field of Classification Search
None
See application file for complete search history.

(56) References Cited

U.S. PATENT DOCUMENTS 4,475,685 A * 10/1984 Grimado ................. F23N 5/203
236/46 R
2014/0365017 A1  12/2014 Hanna et al.
2016/0201932 A1   7/2016 Endo et al.

FOREIGN PATENT DOCUMENTS

CN       103900202 A    7/2014
CN       104197468 A   12/2014
(Continued)

OTHER PUBLICATIONS

Chinese Office Action dated Jul. 24, 2019, issued in Chinese Patent Application No. 201680028315.4.

*Primary Examiner* — Carlos R Ortiz Rodriguez
(74) *Attorney, Agent, or Firm* — Jefferson IP Law, LLP

(57) ABSTRACT

The present invention relates to control of activation of an air conditioning device. More particularly, the present invention provides a method for predicting the time of arrival of a preset indoor temperature based on information regarding environment factors, including a ventilation factor, and controlling the activation time of the air conditioning device such that the present temperature is reached at the target point of time according to the predicted time. In addition, the method provides a method for predicting the target point of time in view of the point of time at which the user will need the air conditioning device. In addition, the present invention provides a method for controlling activation of an air conditioning device in view of the optimal partial load factor (Continued)

of the air conditioning device until the presetting temperature is reached. The present disclosure relates to technologies for sensor networks, machine-to-machine (M2M) communication, machine type communication (MTC), and the Internet of things (IoT). The present disclosure may be utilized for intelligent services (smart homes, smart buildings, smart cities, smart cars or connected cars, health care, digital education, retail businesses, services related to security and safety, etc.).

15 Claims, 20 Drawing Sheets

(51) Int. Cl.
*F24F 11/00* (2018.01)
*F24F 11/77* (2018.01)
*F24F 11/64* (2018.01)
*F24F 110/20* (2018.01)
*F24F 120/10* (2018.01)
*F24F 110/12* (2018.01)
*F24F 140/60* (2018.01)

(52) U.S. Cl.
CPC .............. *F24F 11/64* (2018.01); *F24F 11/77* (2018.01); *F24F 2110/12* (2018.01); *F24F 2110/20* (2018.01); *F24F 2120/10* (2018.01); *F24F 2140/60* (2018.01)

(56) References Cited

FOREIGN PATENT DOCUMENTS

| | | |
|---|---|---|
| CN | 104279715 A | 1/2015 |
| CN | 104566821 A | 4/2015 |
| JP | 2013-044462 A | 3/2013 |
| JP | 2015-048957 A | 3/2015 |
| KR | 10-2004-0076162 A | 8/2004 |
| KR | 10-2007-0028131 A | 3/2007 |
| KR | 10-2009-0132164 A | 12/2009 |
| KR | 10-2012-0012021 A | 2/2012 |
| KR | 10-2015-0040133 A | 4/2015 |

* cited by examiner

METHOD FOR CONTROLLING ACTIVATION OF AIR CONDITIONING DEVICE AND APPARATUS THEREFOR

TECHNICAL FIELD

The present invention relates to a method and apparatus for controlling the starting of an air conditioning device and, more particularly, to a method and apparatus for controlling a starting time of an air conditioning device on the basis of information of environmental factors in a building.

BACKGROUND ART

The Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication, network infrastructure, service interface technology, and security technology are required. Thus, recently, technologies such as a sensor network, machine-to-machine (M2M), and machine type communication (MTC) are studied.

In the IoT environment, an intelligent Internet technology (IT) service can be provided that collects and analyzes data generated from connected things and thereby creates new value in a human life. The IoT can be applied to fields of smart home, smart building, smart city, smart car or connected car, smart grid, health care, smart home appliance, and advanced medical service through the fusion of existing information technology (IT) and various industries.

Meanwhile, a typical technique to control an air conditioning device merely sets or regulates an indoor temperature, humidity, and the like. The air conditioning device has a dominant influence on the comfort level of occupants. A certain occupant who controls the air conditioning device uses a setting method for satisfying the comfort level of occupants in consideration of various environmental factors. However, in case of controlling the air conditioning device by considering only the comfort level of occupants, excessive waste may be often caused in view of energy consumption. Therefore, there is a need of a method for controlling the air conditioning device by considering the amount of energy consumption as well as the comfort level of occupants.

DISCLOSURE OF INVENTION

Technical problem

In order to solve the above-described problems, the present invention provides a method for predicting a setting temperature arrival time of an indoor temperature, based on information of environmental factors including a ventilation factor, and then controlling a starting time of an air conditioning device according to the predicted time such that a setting temperature is reached at a target time point. In addition, the present invention provides a method for predicting the target time point in consideration of a time point when a user needs the air conditioning device. Further, the present invention provides a method for controlling the starting of the air conditioning device in consideration of the optimum partial load factor of the air conditioning device until the setting temperature is reached.

Solution to problem

According to an embodiment of the present invention, a method for controlling starting of an air conditioning device comprises steps of collecting information of at least one environmental factor according to time; predicting an arrival time at which an indoor temperature reaches a setting temperature after a specific time point, based on the collected information of at least one environmental factor; and controlling the starting at the specific time point, based on the predicted arrival time, wherein the at least one environmental factor includes a ventilation factor when the air conditioning device has a ventilation function.

According to another embodiment of the present invention, a method for controlling starting of an air conditioning device comprises steps of collecting information of at least one environmental factor according to time; predicting an arrival time at which an indoor temperature reaches a setting temperature after a specific time point, based on the collected information of at least one environmental factor; controlling the starting at the specific time point, based on the predicted arrival time; and deriving an optimum partial load factor, based on the collected information of at least one environmental factor, wherein the predicting step further considers the derived optimum partial load factor.

According to another embodiment of the present invention, a method for controlling starting of an air conditioning device comprises steps of predicting a target time point at which an indoor temperature in a specific area reaches a setting temperature; predicting an arrival time at which the indoor temperature reaches the setting temperature after a specific time point; and controlling the starting of the air conditioning device, based on the predicted target time point and the predicted arrival time, wherein the predicting step of the target time point is based on predicting an entry time point at which a plurality of users enter the specific area.

According to another embodiment of the present invention, an apparatus for controlling starting of an air conditioning device comprises a transceiver configured to transmit and receive information to and from other apparatus in a system; and a controller configured to collect information of at least one environmental factor according to time, to predict an arrival time at which an indoor temperature reaches a setting temperature after a specific time point, based on the collected information of at least one environmental factor, and to control the starting at the specific time point, based on the predicted arrival time, wherein the at least one environmental factor includes a ventilation factor when the air conditioning device has a ventilation function.

According to another embodiment of the present invention, an apparatus for controlling starting of an air conditioning device comprises a transceiver configured to transmit and receive information to and from other apparatus in a system; and a controller configured to collect information of at least one environmental factor according to time, to predict an arrival time at which an indoor temperature reaches a setting temperature after a specific time point, based on the collected information of at least one environmental factor, to control the starting at the specific time point, based on the predicted arrival time, and to derive an optimum partial load factor, based on the collected information of at least one environmental factor, wherein the controller is further configured to further consider the derived optimum partial load factor to control the starting.

According to another embodiment of the present invention, an apparatus for controlling starting of an air conditioning device comprises a transceiver configured to transmit and receive information to and from other apparatus in a system; and a controller configured to predict a target time point at which an indoor temperature in a specific area reaches a setting temperature, to predict an arrival time at which the indoor temperature reaches the setting temperature after a specific time point, and to control the starting of the air conditioning device, based on the predicted target time point and the predicted arrival time, wherein the target time point is predicted based on predicting an entry time point at which a plurality of users enter the specific area.

Advantageous effects of invention

According to embodiments of the present invention, the method and apparatus for controlling the starting of the air conditioning device may predict a target time point required by the user, control the starting time of the air conditioning device to reach a setting temperature by further considering a ventilation factor, or control a partial load factor of the air conditioning device. It is therefore possible to improve the comfort level of occupants and also reduce the amount of energy consumption by preventing the heat load concentration or heat accumulation phenomenon.

MODE FOR THE INVENTION

Figure 1:
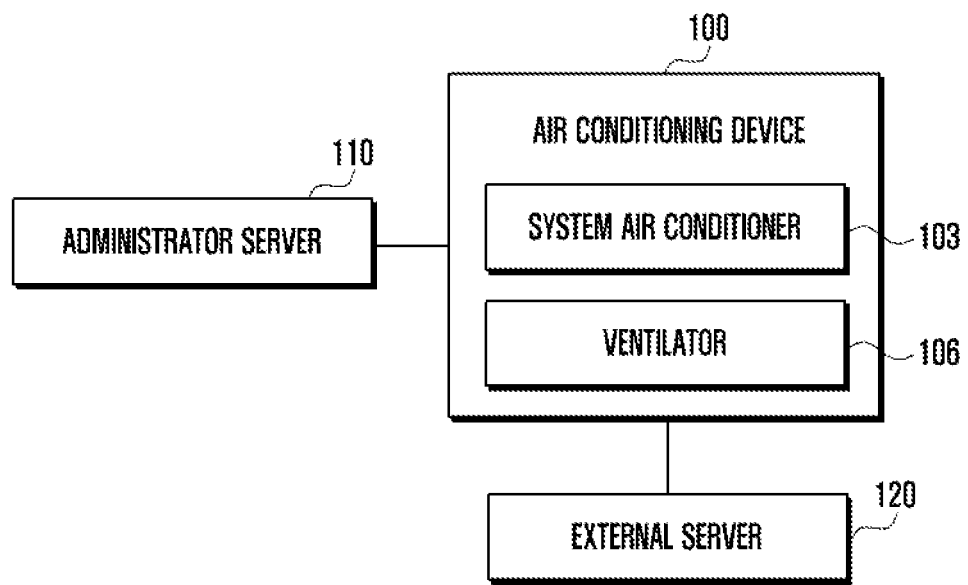
FIG. 1 is a block diagram illustrating the entire configuration of a system for controlling the starting of an air conditioning device according to an embodiment of the present invention.

Hereinafter, embodiments of the present invention will be described with reference to the accompanying drawings.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In this disclosure, the term "environmental factor" refers to information necessary for controlling the starting of the air conditioning device. The environmental factors may include factors that determine the exterior and interior conditions of a building where the air conditioning device is located. For example, the environmental factors may include an outdoor factor, an indoor factor, a setting factor of the air conditioning device, and a ventilation factor.

The outdoor factor may include an outside air temperature, an outside air humidity, an outside air wind speed, and the like. The indoor factor may include an indoor temperature and an indoor humidity. The setting factor of the air conditioning device may include a setting temperature, a setting humidity, etc. which are set by a user. The ventilation factor may include an outside air inflow ratio, an operating state of a ventilator, the total amount of mixed air, and a change in indoor temperature after ventilation. The operating state of the ventilator may be expressed as On/Off or alternatively as 0 or 1. The total amount of mixed air, which is used mainly in a central air conditioning device, refers to the amount of air which is a mixture of the air collected according to the outside air inflow ratio and the air circulated indoors and which flows again into a room.

FIG. 1 is a block diagram illustrating the entire configuration of a system for controlling the starting of an air conditioning device according to an embodiment of the present invention.

Specifically, the system for controlling the starting of the air conditioning device may include an air conditioning device 100, an administrator server 110, and an external server 120.

The air conditioning device 100 is a heating, ventilation, and air conditioning (HVAC) system, and may include a typical air conditioner in the art to which the present invention belongs. The air conditioning device 100 is equipment capable of heating, ventilation, and air conditioning. The air conditioning device may include heat source equipment and cold source equipment. A boiler may be used as the heat source equipment, and it is possible to produce a warm breeze by supplying hot water and steam generated in the boiler to the heating coil in the air conditioning device. A refrigerator may be used as the cold source equipment, and it is possible to produce a cold breeze by supplying water cooled in the refrigerator to the cooling coil. The air conditioning device may include, as accessory equipment of the heat source equipment and the cold source equipment, a cooling tower, a cooling water pump, a boiler feed pump, and an accessory pipe.

In addition, the air conditioning device 100 of the present invention may include not only a central air conditioning device but also an individual air conditioning device having a system air conditioner 103 and a heat recovery type ventilator 106. The system air conditioner 103 may be, for example, a variable refrigerator flow (VRF), and the heat recovery type ventilator 106 may be, for example, an energy recovery ventilator (ERV). The above-described structure of the air conditioning device is exemplary only and not to be construed as a limitation of the present invention. The system air conditioner 103 may include one outdoor unit and at least one indoor unit.

In addition, the administrator server 110 is connected to a user or an administrator in the present invention and may store information related to managing the air conditioning device. Namely, the administrator server may provide a control signal to the air conditioning device and also provide setting temperature information, room occupancy schedule information, equipment schedule information, and the like.

In addition, the external server 120 is connected to the air conditioning device of the present invention and may provide information necessary for the air conditioning device to operate. The external server may include a local data server installed in a weather center or a building, and may provide the air conditioning device with information related to outdoor factors among environmental factors.

Figure 2:
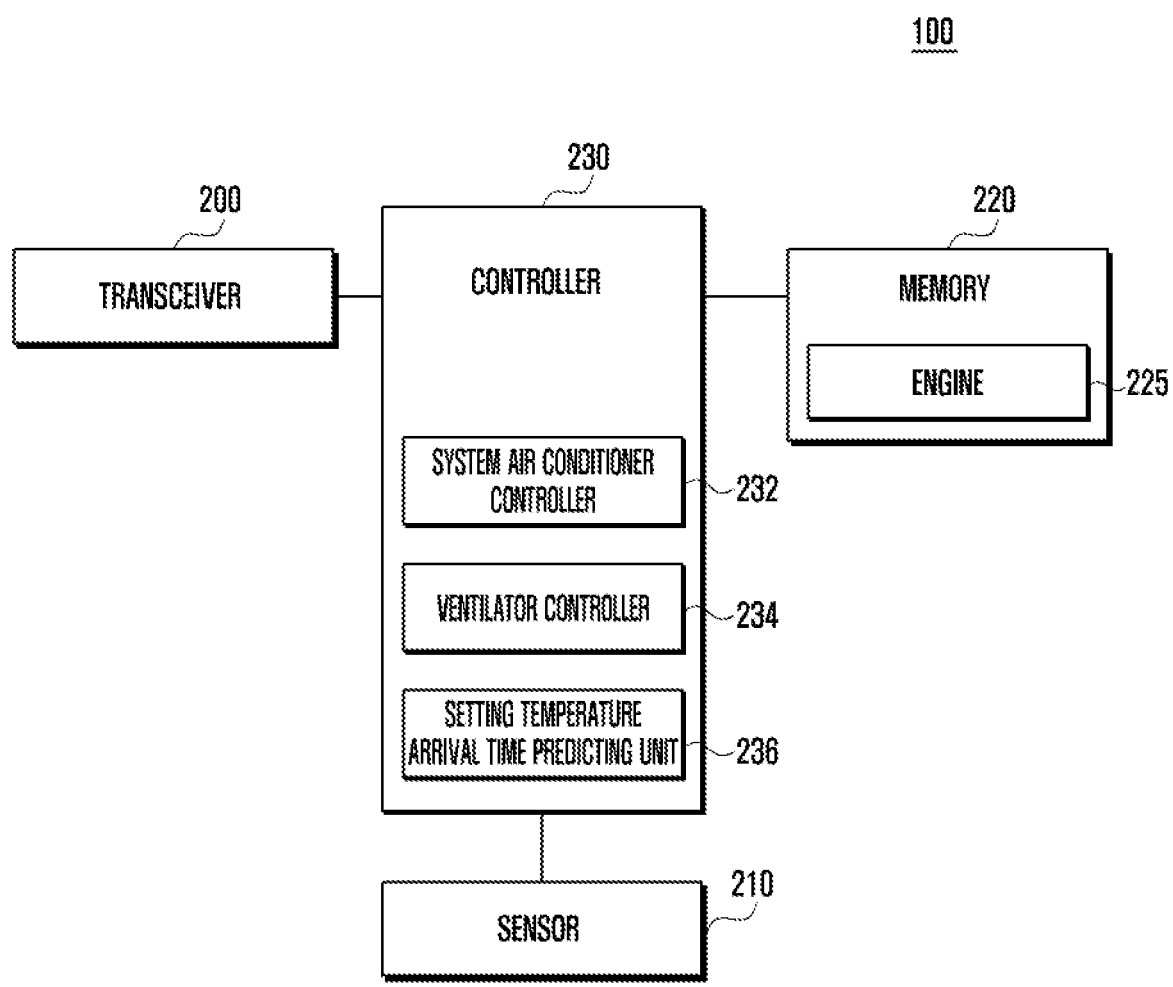
FIG. 2 is a block diagram illustrating an internal structure of an air conditioning device according to an embodiment of the present invention.

FIG. 2 is a block diagram illustrating an internal structure of an air conditioning device according to an embodiment of the present invention.

Specifically, the air conditioning device 100 may include a transceiver 200, a sensor unit 210, a memory 220, and a controller 230. The controller 230 may include a system air conditioner controller 232, a ventilator controller 234, and a setting temperature arrival time predicting unit 236.

The transceiver 200 may receive information necessary for the air conditioning device to operate. The transceiver 200 may be connected to the external server or the administrator server to receive information. The transceiver 200 may transmit the received information to the memory 220 or the controller 230.

Specifically, the transceiver 200 may receive, for example, outdoor factors among environmental factors from the external server. The external server may include a local data server installed in a weather center or a building. Also, the transceiver may receive setting factors of the air conditioning device among environmental factors from the administrator server. Namely, the transceiver may obtain a control signal of the air conditioning device and also receive setting temperature information, room occupancy schedule information, equipment schedule information, and the like.

The sensor unit 210 may acquire information necessary for the air conditioning device to perform the operation of the present invention. The sensor unit 210 may acquire information of environmental factors. Specifically, a sensor of the sensor unit may be used to acquire information related to indoor factors and ventilation factors among environmental factors. For example, the sensor of the sensor unit 210 may include a temperature sensor, a humidity sensor, a heat sensor, and the like.

The memory 220 may store information necessary for the air conditioning device to perform the operation of the present invention. Also, the memory 220 may store information received from the external server or the administrator server by the transceiver 200.

The memory 220 may store information of at least one environmental factor collected in a building where the air conditioning device is located.

In addition, the information of at least one environmental factor may be stored according to time. Namely, the information of environmental factors acquired at an arbitrary time may be stored together with acquisition time information. Also, the information of environmental factors may be stored in a table form together with the time information. Namely, the information of environmental factors acquired at an arbitrary time may be classified and stored.

The memory 220 may receive a part of the information of environmental factors from the transceiver 200. Namely, the memory 220 may store information received by the transceiver 200 from the external server or the administrator server. For example, the external server that transmits outdoor factors among environmental factors may include a local data server installed in a weather center or a building. Also, setting factors of the air conditioning device among environmental factors may be received from the administrator server. Namely, the memory may obtain a control signal of the air conditioning device and also receive setting temperature information, room occupancy schedule information, equipment schedule information, and the like.

In addition, the memory 220 may store information of environmental factors received from the sensor unit 210. Namely, the memory may receive, from the sensor unit 210, information of environmental factors at the current time rather than information already stored and recorded.

The environmental factors may include factors necessary for controlling a starting time of the air conditioning device so as to accomplish the purpose of the present invention, namely, to improve the comfort level and reduce energy consumption, and the present invention is not limited thereto.

In addition, the memory 220 may store information related to a partial load factor of the air conditioning device. First, this information may include history information of the partial load factor at the time of starting the air conditioning device. Also, this information may include optimum partial load factor information derived based on the environmental factors. The optimum partial load factor information may be determined by using information about at least one environmental factor previously stored in the memory 220 and considering whether an indoor temperature reaches a setting temperature at a target time point after the starting of the air conditioning device. Also, the optimum partial load factor information may be determined as information about the lowest partial load factor at which an indoor temperature can reach a setting temperature at a target time point after the starting of the air conditioning device.

In addition, the memory 220 may include modeling information for deriving a setting temperature arrival time of an indoor temperature, based on at least one environmental factor. The term "a setting temperature arrival time of an indoor temperature" may refer to the total time from a starting time point of the air conditioning device to a time point when the indoor temperature reaches the setting temperature. The modeling information may include a function that defines information of at least one environmental factor as an input value and also defines a setting temperature arrival time of an indoor temperature as an output value. For example, when information of environmental factors before a time point of determining the starting of the air conditioning device is defined as an input value, the modeling information may be a function that calculates a setting temperature arrival time of an indoor temperature as an output value.

In addition, the memory 220 may include an engine 220. This engine is used for a learning model and may include various machine learning models and statistical regression analysis models.

The controller 230 may control the starting of the air conditioning device according to the present invention. The controller 230 may collect information of at least one environmental factor according to time, predict an arrival time at which an indoor temperature reaches a setting temperature after a specific time point, based on the collected information of at least one environmental factor, and control the starting at the specific time point, based on the predicted arrival time. Also, the at least one environmental factor may include a ventilation factor when the air conditioning device has a ventilation function.

The controller 230 may control retrieving previously stored information of at least one environmental factor, and also control predicting the time at which the indoor temperature reaches the setting temperature after the specific time point, based on information of at least one environmental factor generated before a unit time than the specific time point.

The controller 230 may collect information of at least one environmental factor according to time, predict an arrival time at which an indoor temperature reaches a setting temperature after a specific time point, based on the collected information of at least one environmental factor, control the starting at the specific time point, based on the predicted arrival time, and derive an optimum partial load factor, based on the collected information of at least one environmental factor. Also, the at least one environmental factor may include a ventilation factor when the air conditioning device has a ventilation function.

The controller 230 may control retrieving previously stored information of at least one environmental factor, and also control predicting the time at which the indoor temperature reaches the setting temperature after the specific time point, based on information of at least one environmental factor generated before a unit time than the specific time point. Also, the controller 230 may control calculating a difference in time between the predicted arrival time and a time from the specific time point to a target time point, and starting at the specific time point when the difference is less than a given threshold.

The controller 230 may collect information of at least one environmental factor according to time, predict an arrival time at which an indoor temperature reaches a setting temperature after a specific time point, based on the collected information of at least one environmental factor, control the starting at the specific time point, based on the predicted arrival time, and derive an optimum partial load factor, based on the collected information of at least one environmental factor. Also, the controller 230 may control the starting by further considering the derived optimum partial load factor.

The controller 230 may control the starting based on the derived optimum partial load factor. Also, the controller may derive a weight of information of at least one environmental factor for an arrival time at which an indoor temperature reaches a setting temperature, derive the optimum partial load factor, based on the weight, predict the arrival time at which the indoor temperature reaches the setting temperature after a specific time point according to the information of at least one environmental factor and the partial load factor, based on the weight, calculate the lowest partial load factor at which the predicted arrival time is within a predetermined limit of arrival time, and derive the optimum partial load factor from the calculated lowest partial load factor.

When controlling a plurality of air conditioning devices installed in a certain area, the controller 230 may calculate a partial load factor of each air conditioning device for deriving the optimum efficiency, based on both the number of indoor units connected to the plurality of air conditioning devices and the highest efficiency of each of the plurality of air conditioning devices, and then control the air conditioning device, based on the calculated partial load factor of each air conditioning device.

The controller 230 may predict a target time point at which an indoor temperature in a specific area reaches a setting temperature, predict an arrival time at which the indoor temperature reaches the setting temperature after a specific time point, and control the starting of the air conditioning device, based on the predicted target time point and the predicted arrival time, wherein the target time point is predicted based on predicting an entry time point at which a plurality of users enter the specific area.

The controller 230 may predict the entry time point, based on distribution information about an entry time of the plurality of users for the specific area. Also, when the distribution information exceeds a given threshold, the controller may determine whether users corresponding to the entry time point before the specific time point are present more than a given number. If so, the controller may extract a target person to be used for predicting the entry time point and then generate an entry time point predictive modeling for the target person so as to predict the entry time point.

If the distribution information is less than the given threshold, the controller 230 may determine whether there is a cluster where a given number of persons or more are distributed. If a user's entry time point corresponding to the entry time point before the specific time point is fixed, the controller 230 may exclude a user corresponding to the fixed entry time point before the specific time point from the target persons to be used for predicting the entry time point. If the user's entry time point is not fixed, the controller may extract the user corresponding to the fixed entry time point before the specific time point as the target person to be used for predicting the entry time point.

The system air conditioner controller 232, the ventilator controller 234, and the setting temperature arrival time predicting unit 236 in the controller 230 may perform some of the operations of the controller 230.

In addition, the operations performed by the transceiver 200, the memory 220, and the controller 230 in the air conditioning device may be performed by any other apparatus capable of performing the same function. For example, the administrator server connected to the air conditioning device may receive information necessary for controlling the air conditioning device, store the received information, and control the air conditioning device.

Figure 3:
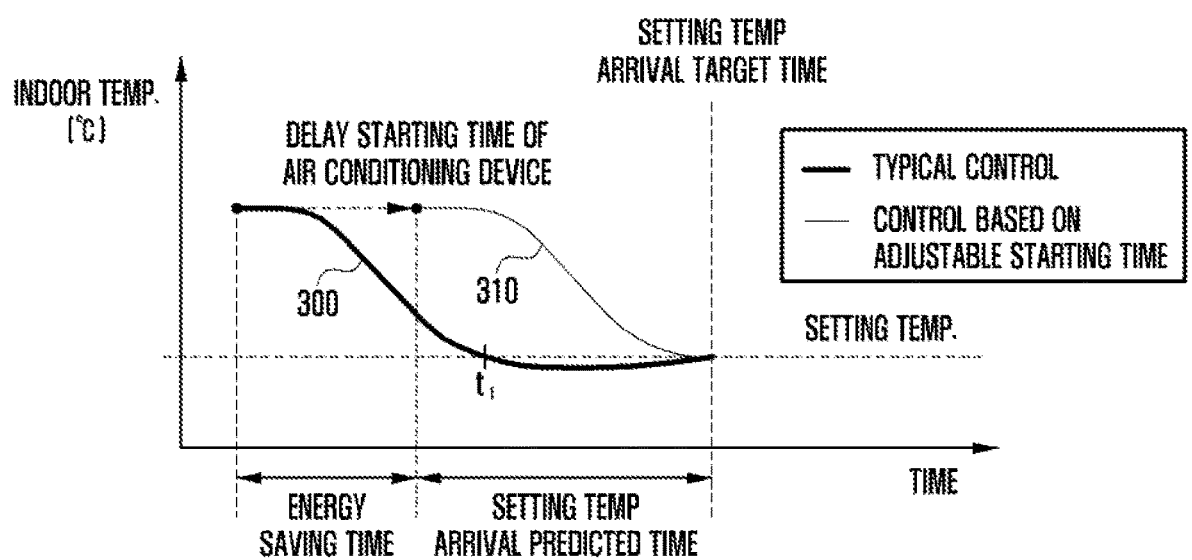
FIG. 3 is a diagram illustrating a method for controlling a starting time of an air conditioning device according to an embodiment of the present invention.

FIG. 3 is a diagram illustrating a method for controlling a starting time of an air conditioning device according to an embodiment of the present invention.

According to a typical technique, the air conditioning device is immediately started such that an indoor temperature reaches a setting temperature at a target time. Namely, without considering environmental factors, the air conditioning device is started at an arbitrary time before the target time. Referring to an indoor temperature variation graph 300 according to time in a typical control method, the indoor temperature reaches the setting temperature at a certain time (t1) before a setting temperature arrival target time and is then lowered below the setting temperature while the air conditioning device is continuously operated. Therefore, according to this case of typical control 300, unnecessary energy waste may be caused.

In contrast, referring to an indoor temperature variation graph 310 according to time when a starting time of the air conditioning device is controlled and adjusted, a time required for the indoor temperature to reach the setting temperature is predicted, and the air conditioning device is started earlier by the predicted time than the setting temperature arrival target time. In this case, even though the starting time of the air conditioning device is delayed later in comparison with the above-discussed typical control 300, the setting temperature may be reached at the same time to ensure the comfort level of occupants. Further, this case 310 of adjusting the starting time of the air conditioning device may reduce energy corresponding to the starting time delayed from that of the typical case 300, thus preventing unnecessary waste of energy.

The present invention provides a method for adjusting the starting time of the air conditioning device to improve the comfort level of occupants and reduce energy consumption.

Figure 4:
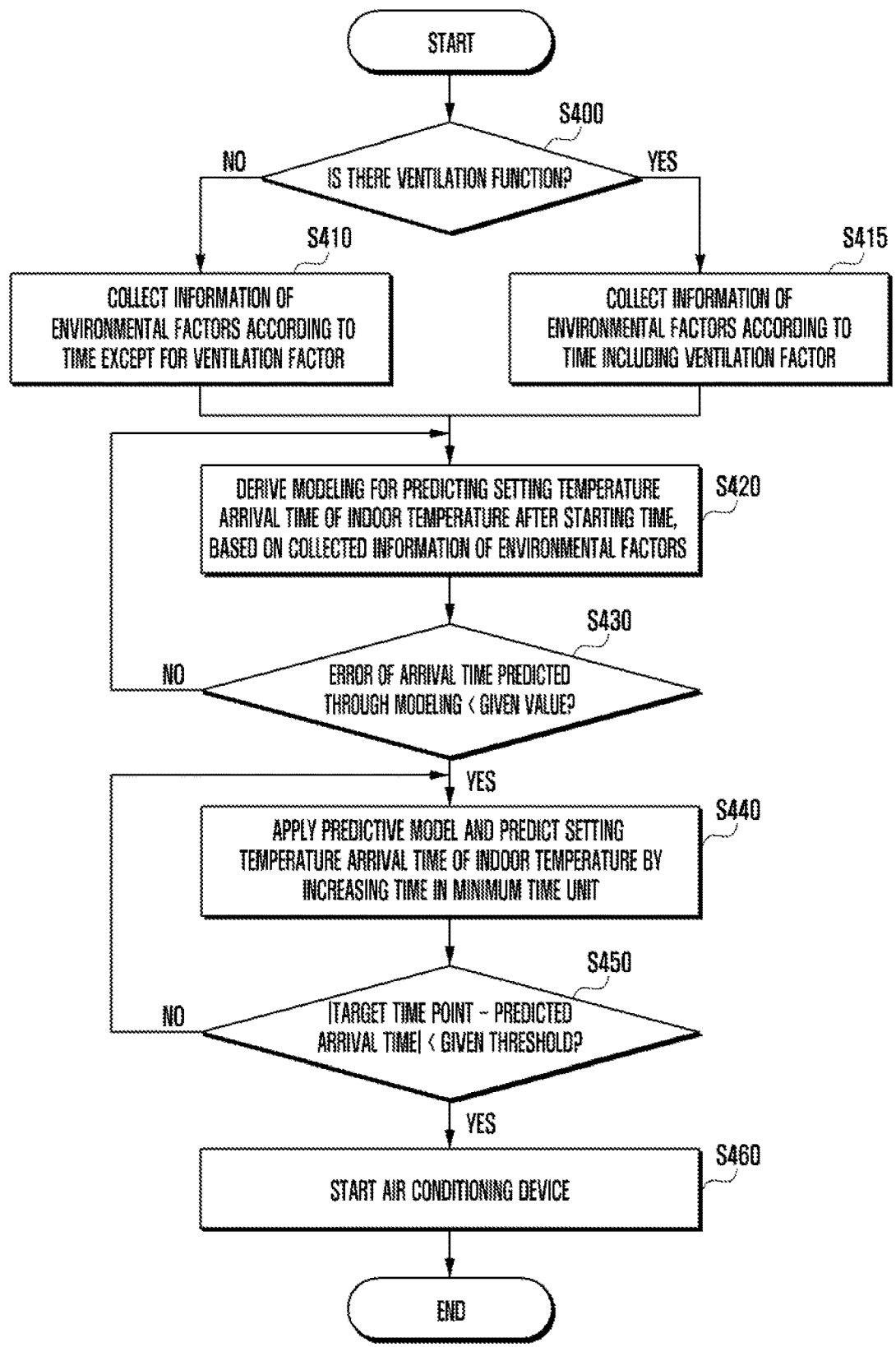
FIG. 4 is a flow diagram illustrating a method for controlling a starting time of an air conditioning device according to an embodiment of the present invention.

FIG. 4 is a flow diagram illustrating a method for controlling a starting time of an air conditioning device according to an embodiment of the present invention.

At step S400, the air conditioning device may determine whether there is a ventilation function. As described above, the air conditioning device of the present invention may include various types of air conditioning device. Namely, the air conditioning device may include equipment having the system air conditioner and the ventilator as well as equipment capable of performing heating, ventilation, and air conditioning (HVAC). Therefore, the above step of determining whether there is a ventilation function may include a step of identifying the type of the air conditioning device, for example, a central air conditioning device, an individual air conditioning device having both the system air conditioner and the ventilator, or equipment having only the system air conditioner. If the air conditioning device is the central air conditioning device or the individual air conditioning device, it may be determined that the air conditioning device has a ventilation function. If the air conditioning device has only the system air conditioner without any ventilator, it may be determined that the air conditioning device has no ventilation function.

If there is no ventilation function in the air conditioning device, the air conditioning device may collect information of environmental factors according to time except for a ventilation factor at step S410. Namely, since there is no need to consider environmental conditions according to the ventilation factor when the air conditioning device has no ventilation function, only information of environmental factors except a ventilation factor may be collected. If the ventilator is installed in the air conditioning device, the air conditioning device may collect information of environmental factors according to time including ventilation information at step S415.

Collecting the information of environmental factors may include retrieving such information previously stored in the memory of the air conditioning device. In addition, information of at least one environmental factor may be stored together with time information, and the information of environmental factors may be retrieved together with the time information.

In addition, if it is determined that additional information of environmental factors is required in addition to the information of environmental factors previously stored in the memory, the air conditioning device may further acquire information of environmental factors by using the transceiver and the sensor unit. For example, in order to obtain a certain number of samples in deriving the modeling for predicting an arrival time of an indoor temperature by using information of environmental factors, the air conditioning device may further acquire the information of environmental factors.

Namely, the air conditioning device may request the external server or the administrator server to additionally provide information of environmental factors. In this case, the transceiver of the air conditioning device may receive the information of environmental factors according to time from the external server or the administrator server. Also, the air conditioning device may further acquire information of an indoor factor or the like among environmental factors from the sensor unit.

Hereinafter, it is assumed that the air conditioning device is placed in an environmental condition of impossible ventilation in spite of having a ventilation function. In this case, the air conditioning device collects information of environmental factors according to time including ventilation information at step S415 because of having a ventilation function. However, because the air conditioning device does not need to use the ventilation function, the numerical value of ventilation information may be a basic value or zero. The ventilation information may include the quality of indoor air (e.g., the amount of carbon dioxide ($CO_2$)), the quality of outdoor air (e.g., the concentration of fine dust), a comparison between an indoor temperature and an outdoor temperature. In another embodiment, the air conditioning device may determine whether to further collect ventilation information at step S415. Namely, the air conditioning device may determine whether environment allows ventilation, and if environment disallows ventilation, may assign a basic value or zero to the value of ventilation information before collecting the ventilation information.

In addition, at step S420, the air conditioning device may derive a modeling for predicting a setting temperature arrival time of an indoor temperature after a starting time, based on the collected information of environmental factors. The modeling may include a function that defines information of at least one environmental factor as an input value and also defines a setting temperature arrival time of an indoor temperature as an output value. For example, when information of environmental factors before a time point of determining the starting of the air conditioning device is defined as an input value, the modeling information may be a function that calculates a setting temperature arrival time of an indoor temperature as an output value. The functional formula may be determined in consideration of weights of environmental factors that affect the prediction of a setting temperature arrival time of an indoor temperature.

In order to derive the modeling, the air conditioning device may use information of environmental factors generated before a unit time than a time point of determining the starting of the air conditioning device. Namely, if relying on information generated after the time point of determining the starting of the air conditioning device, the amount of information to be used by the air conditioning device becomes large. This may cause a problem of excessive load in a process of executing algorithm. In this case, it is advantageous to utilize previously stored information or real-time information, being collectable through the installed sensor, instead of information generated after the time point of determining the starting of the air conditioning device.

In addition, a process of retrieving information to derive the modeling may not require learning information that deviates from the existing starting time pattern. Namely, the above time point of determining the starting of the air conditioning device may be set as a basic time (e.g., set to 6 o'clock as in the baseline), and information of environmental factors at the basic time may be utilized for modeling. Also, in order to increase the accuracy of the modeling derived using the collected information of environmental factors, the air conditioning device may generate and use various parameters by utilizing the collected information of environmental factors. For example, using indoor and outdoor temperature/humidity included in environmental factors and combinations thereof, the air conditioning device may simulate radiation, convection, and conduction, based on heat transfer theory. Also, as a modeling method, the air conditioning device may utilize various machine learning methods or statistical regression model methods. For example, in modeling that uses the collected information of environmental factors, the air conditioning device may use 60% of the collected information as a training set and 40% as a test set. Namely, in order to derive the modeling, the air conditioning device may use 60% of the collected information of environmental factors as an input value (i.e., information of environmental factors) and an output value (i.e., a setting temperature arrival time), and also use 40% as only an input value. Thus, the air conditioning device may improve the accuracy of modeling.

Deriving the modeling for predicting a setting temperature arrival time of an indoor temperature by collecting information of environmental factors is merely one embodiment. The present invention is not limited to the above-described embodiment, and any other embodiment is applicable by those skilled in the art.

In addition, at step S430, the air conditioning device may determine whether an error of the setting temperature arrival time of an indoor temperature predicted by the derived modeling is equal to or less than a predetermined value. The air conditioning device may evaluate the derived modeling. To evaluate the modeling, the test set may be used. Specifically, the air conditioning device may calculate the setting temperature arrival time predicted using, as an input value, information of environmental factors generated at the time point of determining the starting of the air conditioning device in the derived modeling. Then, the air conditioning device may calculate an error by comparing the predicted setting temperature arrival time with the time at which an indoor temperature actually reaches a setting temperature. For determining whether the calculated error is equal to or less than a predetermined value, the air conditioning device may use a mean bias error (MBE), a mean percentage error (MPE), a mean absolute percentage error (MAPE), a root mean square error (RMSE), a mean absolute deviation (MAD), and the like.

If the error of the setting temperature arrival time of an indoor temperature predicted by the modeling exceeds the predetermined value, the air conditioning device may return to step S420 and derive again the modeling for predicting the setting temperature arrival time of an indoor temperature after a starting time, based on the collected information of environmental factors. In this case, the air conditioning device may derive the modeling by using a larger number of samples or a larger number of environmental factors. In this case, the air conditioning device may derive the modeling that has a reduced error and increases the accuracy in predicting the arrival time.

If the error of the setting temperature arrival time of an indoor temperature predicted by the modeling is equal to or less than the predetermined value, the air conditioning device may apply the derived modeling and predict the setting temperature arrival time of an indoor temperature by increasing a time in the minimum time unit at step S440. Namely, in a cycle of a sensing time step (e.g., one minute interval), which is the minimum time unit, from a basic time point (e.g., 6 o'clock), the air conditioning device may determine whether to start the air conditioning device. In addition, the air conditioning device may determine whether to start the air conditioning device, through repeated calculation performed in a certain cycle (e.g., five minutes, ten minutes, etc.) longer than a cycle of a sensing time step. At the time point of determining whether to start the air conditioning device, the air conditioning device may predict the setting temperature arrival time of an indoor temperature. When determining whether to start the air conditioning device in a cycle of the minimum time unit from the basic time point, the basic time point may be referred to as a first time point, and the time point of the next cycle may be referred to as a second time point. As described above, the air conditioning device may calculate the setting temperature arrival time of an indoor temperature by using, as an input value, the information of environmental factors before the time point of determining the starting of the air conditioning device.

Thereafter, at step S450, the air conditioning device may determine whether a difference between a target time point and a predicted arrival time point (i.e., a difference between a setting temperature arrival target time and the sum of the time point of determining whether to start the air conditioning device and the predicted setting temperature arrival time) is less than a given threshold. At this time, the air conditioning device may use the setting temperature arrival time of an indoor temperature predicted at the basic time point (i.e., the first time point). For example, if it is assumed that the basic time point is six o'clock, the target time point is eight o'clock, and the setting temperature arrival time of an indoor temperature predicted at the basic time point is 1 hour and 30 minutes, the air conditioning device may determine whether 30 minutes corresponding to a difference between 8:00 (the target time point) and 7:30 (the predicted arrival time point) is shorter than the given threshold. The given threshold may be predefined by a manufacturer of the air conditioning device and stored in the memory of the air conditioning device, or may be determined by an administrator or a user.

If the above difference in time is equal to or greater than the given threshold, the air conditioning device may return to step S440 and predict the setting temperature arrival time of an indoor temperature by applying the modeling predicted at the time point of the next cycle. Thereafter, the air conditioning device performs the operation of step S450. By repeating steps S440 and S450, the air conditioning device may improve the accuracy of predicting the starting time of the air conditioning device such that an indoor temperature can reach a setting temperature at a specific time point targeted by the user or the administrator.

If the above difference in time is less than the given threshold, the air conditioning device may control the starting thereof at step S460. Since the air conditioning device includes various types in the present invention, controlling the starting of the air conditioning device may include, for example, starting the central air conditioning device, starting the system air conditioner included in the individual air conditioning device, and starting simultaneously both the system air conditioner and the ventilator included in the individual air conditioning device.

In the present invention, if the air conditioning device has a ventilation function, the air conditioning device may determine and control the starting time of the air conditioning device in consideration of a ventilation factor. Namely, by considering environmental changes due to the ventilation factor, the air conditioning device of the present invention may solve a problem of wasting the energy consumption of the air conditioning device due to unnecessarily early starting. Also, in case of an air conditioning device that includes the system air conditioner and the ventilator separately, this air conditioning device may start the ventilator by considering environmental factors even after the starting operation.

Namely, when ventilation-related factors (e.g., an outside air inflow ratio, on/off, the total amount of mixed air, a change in indoor temperature after ventilation, etc.) is utilized for ventilation-interworking modeling operation, it is different from the air conditioning device which does not consider the ventilation factors. Because, the setting temperature arrival time is changed due to ventilation, at least one ventilation-related factor may be further used for modeling, thereby improving the accuracy.

In addition, FIG. 4 merely illustrates one embodiment of the operation for controlling the starting of the air conditioning device by considering the ventilation factor in the environmental factors. It will be apparent to those skilled in the art that other modified embodiments based on the technical idea of the present invention are possible in addition to the above-discussed embodiment disclosed in FIG. 4. Such modified embodiments may include altering the order of steps shown in the drawing.

Figure 5:
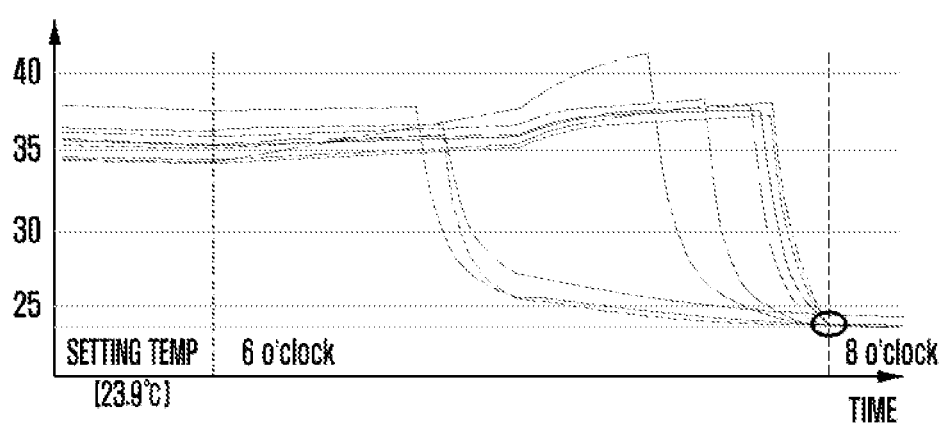
FIG. 5 is a diagram illustrating a difference in thermal efficiency by space in the same weather according to an embodiment of the present invention.

FIG. 5 is a diagram illustrating a difference in thermal efficiency by space in the same weather according to an embodiment of the present invention.

Specifically, FIG. 5 shows a difference in thermal efficiency of respective spaces caused by various environmental factors when the air conditioning device is started in each space in the same weather situation. For example, when a setting temperature is 23.9 degrees, the air conditioning device is started so as to reach the setting temperature at a target time. Then, an indoor temperature reaches 23.9 degrees at the target time, but variations of the indoor temperature in each space may be different in time.

Considering this result indicating a difference in thermal efficiency by space, the environmental factors used for predicting the starting time of the air conditioning device may include a spatial factor. The spatial factor may include, for example, a difference in temperature between adjacent spaces. Namely, even though the same environmental factors and the same setting temperature are used, any other environmental factor capable of reflecting the influence of a heat load from adjacent spaces may be further considered.

Figure 6A:
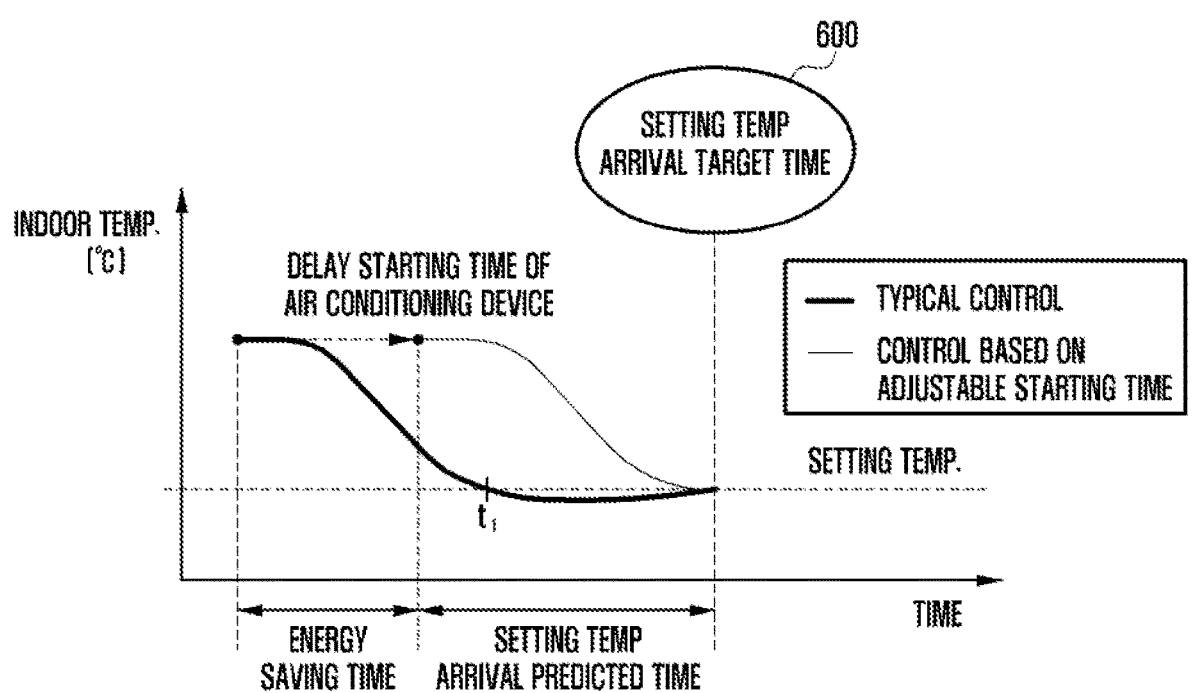
FIGS. 6A and 6B are diagrams illustrating a method for deriving a setting temperature arrival target time of an air conditioning device according to an embodiment of the present invention.
Figure 6B:
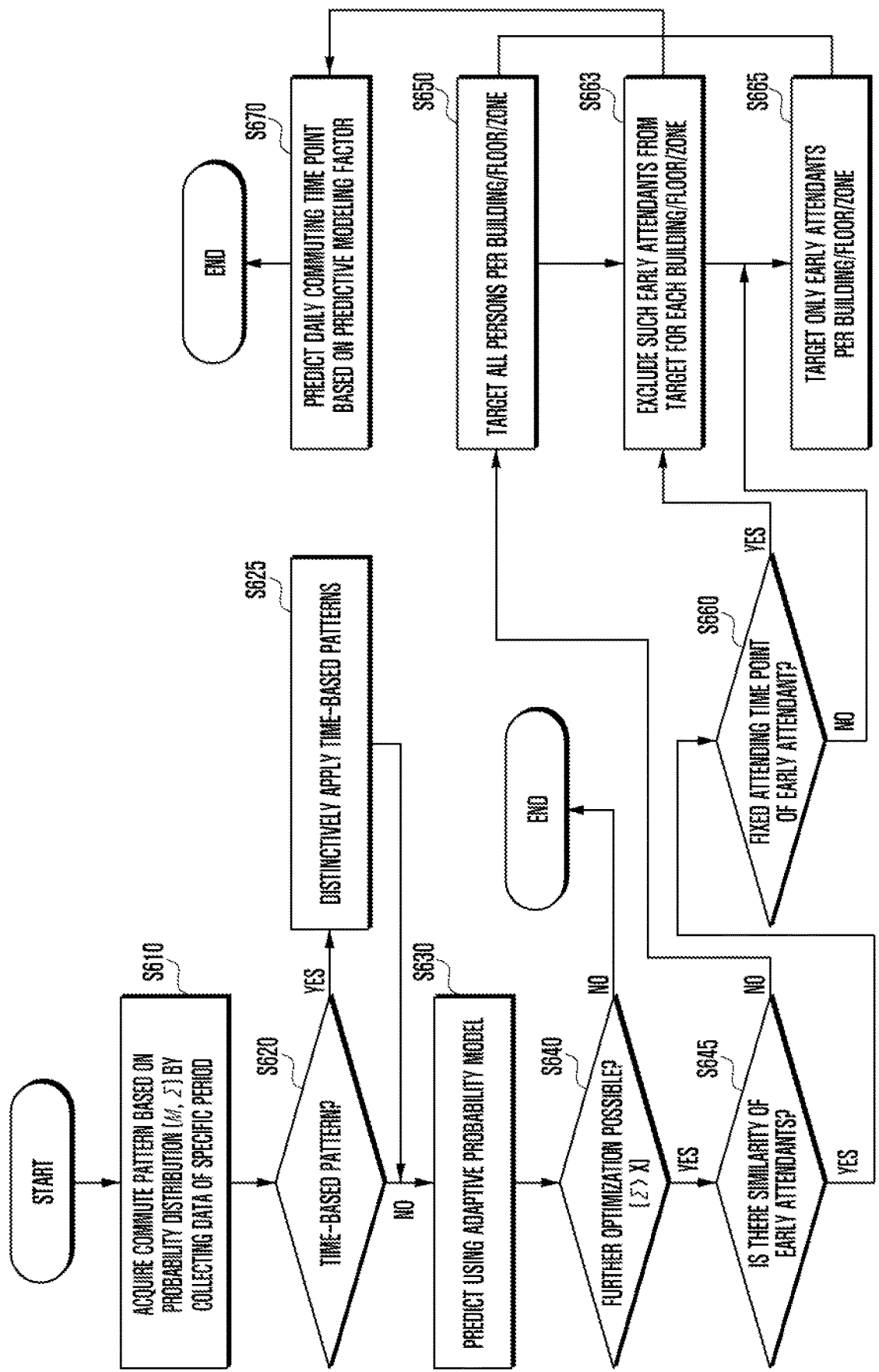

FIGS. 6A and 6B are diagrams illustrating a method for deriving a setting temperature arrival target time of an air conditioning device according to an embodiment of the present invention.

In FIGS. 6A and 6B to FIGS. 9A and 9B, a method for predicting the setting temperature arrival target time 600 shown in FIG. 6A will be described. Specifically, provided is a method for deriving a target time point by predicting a starting or stop-required time point of the air conditioning device. The starting or stop-required time point of the air conditioning device may be estimated as a time point when a plurality of users enter or leave a certain space in which the air conditioning device is installed. For example, in case of controlling the air conditioning device installed in a home, an entrance or exit time point of a plurality of members may be considered. In case of controlling the air conditioning device installed in a workplace, a commuting time point of a plurality of workers may be considered. In the present invention, the air conditioning device installed in a workplace is exemplarily used for convenience of explanation, and a process of deriving the target time point by predicting the commuting time point of the plurality of workers is also exemplarily described. The following examples to be described below may be applied to the air conditioning device installed in any other place as apparent to those skilled in the art.

FIG. 6B shows in detail a method for deriving the target time point. The air conditioning device may acquire a commute pattern based on probability distribution by collecting data of a specific period stored in the external server (S610). The external server may include a worker management server installed in the workplace. The specific period may include, for example, a period of one month. Thereafter, the air conditioning device may determine whether the pattern is acquired in a time-based pattern (S620). Namely, the air conditioning device may determine whether time information of the pattern is acquired together. For example, it is possible to determine whether the pattern includes the time information obtained by weekday, weekend, or day of the week. If the acquired patterns include the time information and can be distinguished by the acquisition time, the air conditioning device may distinctively apply the time-based patterns when predicting the commuting time point (S625). If the acquired patterns do not include the time information and are not distinguishable by the acquisition time, the air conditioning device may perform the prediction by using an adaptive probability model (S630). The adaptive probability model refers to a model that can reflect recent patterns by applying a modified probability model over time. This includes a method for predicting the commuting time point, based on the probability distribution of the acquired patterns, and more details will be described later with reference to FIGS. 7A and 7B.

Thereafter, the air conditioning device may determine whether there is a possibility of further optimizing the predicted commuting time point (S640). This determination may be performed by comparing the sigma (σ) value of the probability distribution of the acquired pattern with a predetermined threshold value. The sigma value refers to a distribution degree based on an average value in the probability distribution, and may include, for example, a standard deviation. If the sigma value exceeds the predetermined value (x), it means that there are more than a certain number of personnel relatively far away from the average value, and thus means that further optimization for predicting the commuting time point is possible in consideration of this. If it is determined at step S640 that there is no possibility of further optimization, the air conditioning device may derive the target time point from the commuting time point predicted at step S630 and terminate the method.

However, if it is determined that there is a possibility of further optimization, the air conditioning device may further determine whether there is any similarity of early attendants (S645). If the number of persons determined as early attendants is close to a certain percentage of the total, it is determined that there is the similarity of early attendants. Namely, when there are a sufficient number of persons who influence the prediction of the starting time of the air conditioning device, this is taken into consideration. A detailed description will be given in FIG. 8.

Thereafter, depending on whether there is the similarity of early attendants, the air conditioning device may differently determine a target for predicting a daily commuting time point based on a predictive modeling factor. Namely, if there is no similarity of early attendants, the air conditioning device may determine all persons per building/floor/zone as the target (S650) and predict the daily commuting time point based on the predictive modeling factor (S670). If there is the similarity of early attendants, the air conditioning device may further determine whether an attending time point of the early attendant is fixed (S660). If the standard deviation is within a certain time (x minutes) when calculating the one-month average of the daily averages of early attendants in the recent month, it is determined that the attending time point of the early attendant is fixed. When the attending time point of the early attendant is fixed, the air conditioning device may predict the daily commuting time point based on the predictive modeling factor by excluding early attendants having fixed attending time points from the target for each building/floor/zone (S663). For early attendants having no fixed attending time points, separate control operations of air conditioning may be added. Also, when the attending time point of the early attendant is not fixed, the air conditioning device may predict the daily commuting time point based on the predictive modeling factor by targeting only the early attendants per building/floor/zone (S665). The operation (S670) of predicting the daily commuting time point based on the predictive modeling factor will be described in detail with reference to FIGS. 9A and 9B.

Figure 7A:
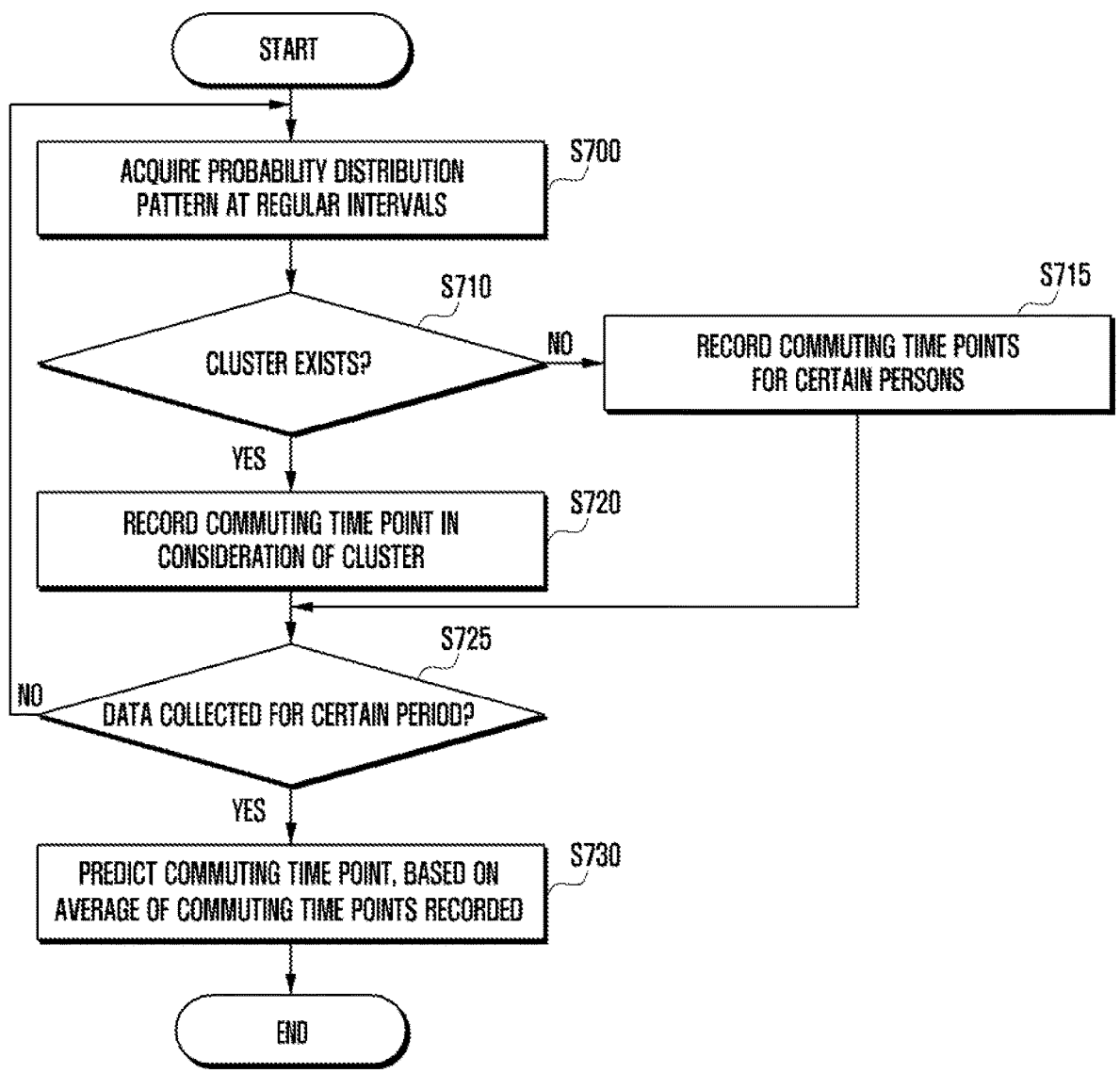
FIGS. 7A and 7B are diagrams illustrating a method for deriving a setting temperature arrival target time by using an adaptive probability model according to an embodiment of the present invention.
Figure 7B:
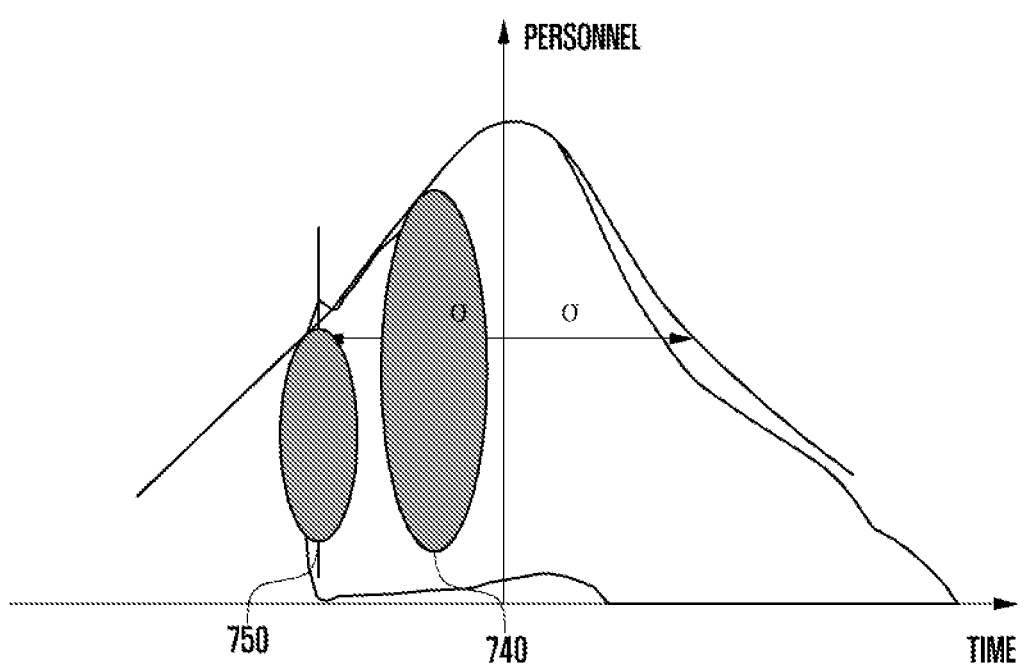

FIGS. 7A and 7B are diagrams illustrating a method for deriving a setting temperature arrival target time by using an adaptive probability model according to an embodiment of the present invention.

Specifically, FIG. 7A shows the above-described step S630 of FIG. 6A. The air conditioning device may acquire a probability distribution pattern of the worker for the commuting time point at regular intervals. This regular interval may include daily, weekly, or monthly. The acquired probability distribution pattern is, for example, as shown in FIG. 7B. In this case, the air conditioning device may determine whether a cluster exists in the probability distribution pattern (S710). The cluster may refer to a case where a given number of persons or more are distributed at an arbitrary time point. For example, when 5% of the total number of persons is concentrated at a certain time point, this time point may be referred to as the cluster. For example, the cluster may occur when a bus arrives at an attending time point or departs at a quitting time.

If it is determined that there is no cluster, the air conditioning device may record the commuting time points in a certain period for certain persons (S715). If the period is, for example, one month, it means that the air conditioning device records all the commuting time points during one month before a recording time point. Thus, it is possible to reflect recent patterns by applying a modified probability model over time. Recording the commuting time points for certain persons may include recording the commuting time points of the earliest attending person and the last leaving person among the acquired probability distribution pattern. Alternatively, recording the commuting time points for certain persons may include recording the time point at which k % of the total persons enter the workplace and the time point at which (100−k) % of the total persons leave the workplace. The air conditioning device may select one of the above two methods to record the commuting time point when there is no cluster.

If it is determined that there is any cluster, the air conditioning device may record the commuting time point in consideration of the cluster (S720). This is shown in FIG. 7B. In this case, the air conditioning device may record the time point at which K % of the total persons enter the workplace, and also record the commuting time point of persons contained in the cluster 740 at the time point when the k % persons enter the workplace. If the cluster 750 is located at the boundary line of the time point when the K % persons enter the workplace, the commuting time points of all persons in the cluster before the time point when the K % persons enter the workplace.

Thereafter, the air conditioning device may determine whether the above record of commuting time points is for a predetermined period or more (S725). If there is no record for the predetermined period or more, the air conditioning device may return to step S700 to continuously record the commuting time point.

In addition, if it is determined that data of the predetermined period is collected, the air conditioning device may predict the commuting time point, based on the average time point of the commuting time points recorded above. The air conditioning device may derive the setting temperature arrival target time from the predicted commuting time point.

Figure 8:
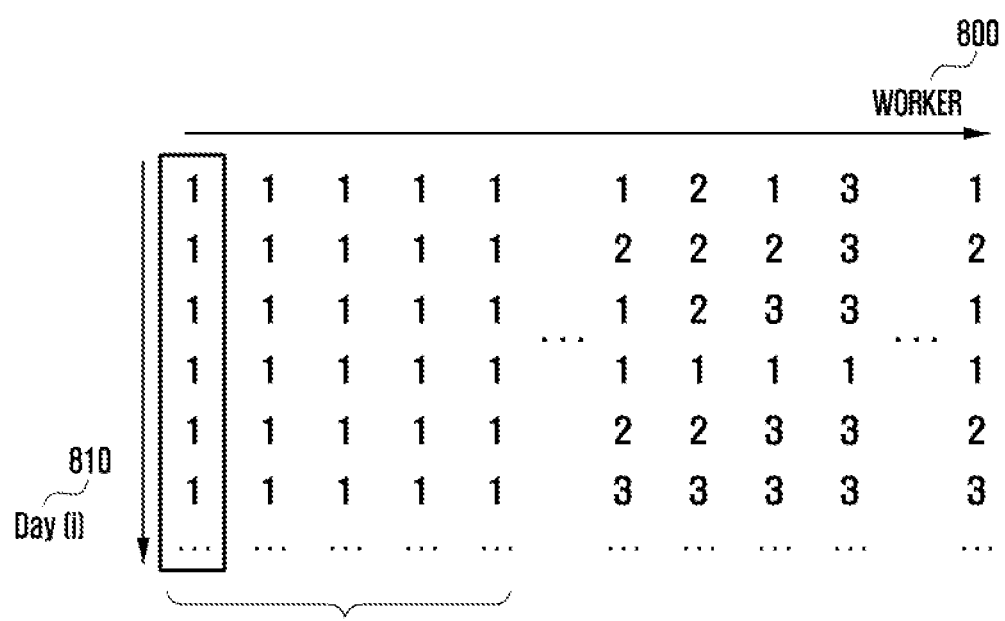
FIG. 8 is a diagram illustrating a method for determining whether there is a similarity of early attendants according to an embodiment of the present invention.

FIG. 8 is a diagram illustrating a method for determining whether there is a similarity of early attendants according to an embodiment of the present invention.

Specifically, FIG. 8 shows a method for determining whether there is consistency in a user's attending time.

The horizontal axis represents workers 800, the vertical axis represents day (i) 810, and data refers to data assigned based on the attending time by the worker. The data may indicate a number assigned in the unit of k % of the total workers. For example, if k is 16, the number one is assigned to workers from the earliest attending worker to 16% workers. Then, the number two is assigned to workers corresponding to 34%. The following equation may be used to determine whether there is the similarity of early attendants.

$$\Sigma_{i=1}^{day}(day\_n(i))^2 < Threshold1 \qquad \text{Equation 1}$$

Namely, when the sum of squares of the data assigned based on a certain period with respect to one worker is less than a specific threshold value (Threshold 1), it may be determined that this worker is an early attendant. If the number of early attendants determined using the above equation is close to s % of the total workers, it may be determined that there is the similarity of early attendants. The case of closing to s % may include a range within 2% of error rate.

Figure 9A:
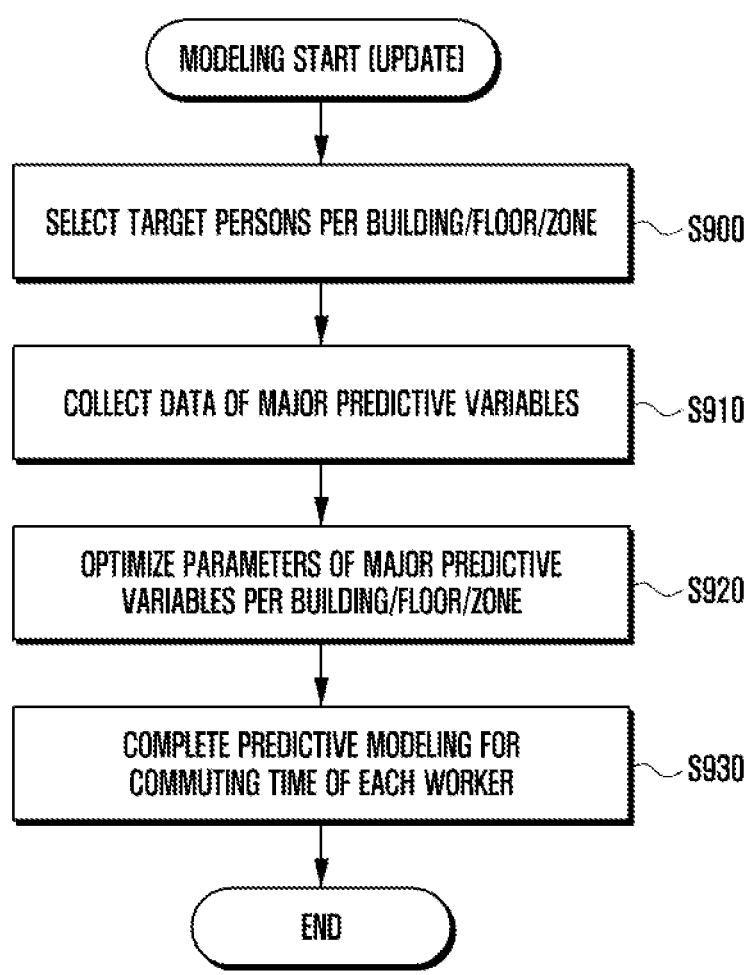
FIGS. 9A and 9B are diagrams illustrating a method for generating a prediction model and deriving the setting temperature arrival target time based on the prediction model according to an embodiment of the present invention.
Figure 9B:
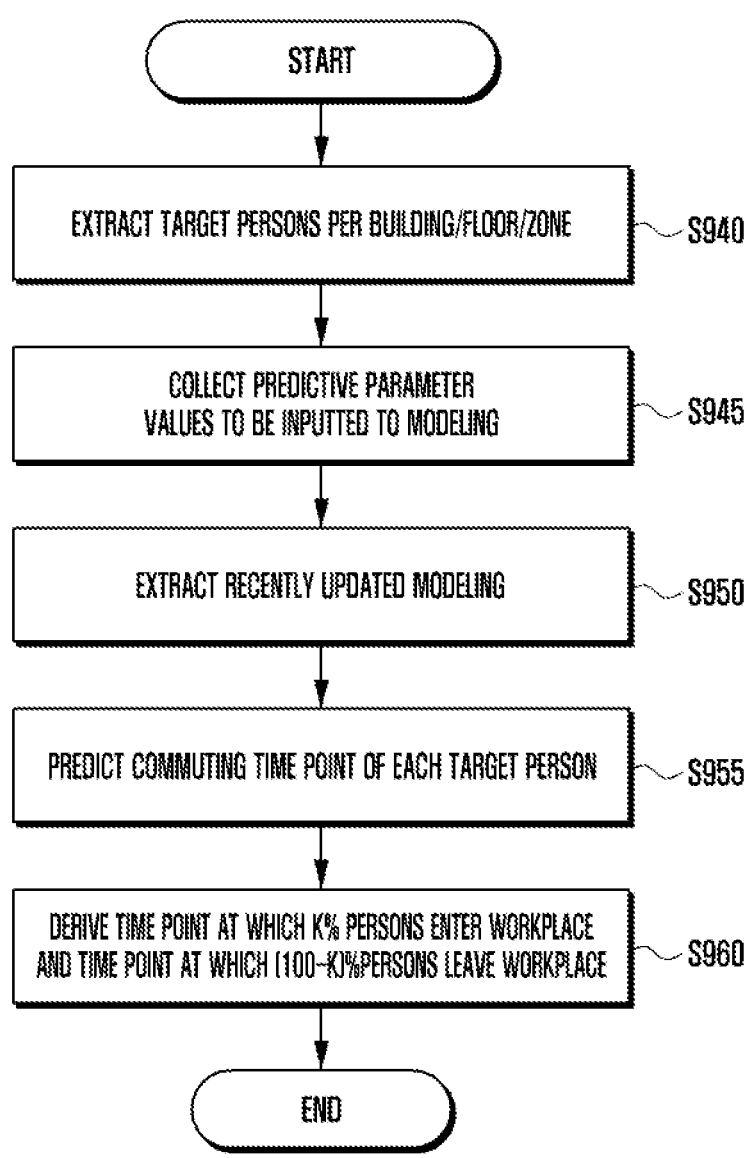

FIGS. 9A and 9B are diagrams illustrating a method for generating a prediction model and deriving the setting temperature arrival target time based on the prediction model according to an embodiment of the present invention.

Specifically, FIGS. 9A and 9B show details of the above-described step S670 in FIG. 6B.

When starting modeling or updating a previously generated modeling, the air conditioning device may select target persons per building/floor/zone (S900). This means selecting the target at the above-described steps S650, S663 and S665 in FIG. 6B. Thereafter, the air conditioning device may collect data of major predictive variables that affect the commuting time point. For example, the variables may include at least one of weather, traffic volume, location, and time related variables. Specifically, the weather-related variables may include the amount of clouds, a sunrise time, a sunset time, wind strength, and outside air temperature/humidity, and may utilize forecast information received from the weather center server or measured at a place where the air conditioning device is installed. Also, the traffic-related variables may include traffic volume information on the vicinity of the corresponding building, a major highway, and a major road to work, and may utilize traffic collection information or real-time travel time prediction information received from the external server.

In addition, the location-related variables may include a home location of a worker, a current location, a distance between a house and a workplace, information on whether to use a private car or a commuter shuttle, etc., and may utilize real-time travel time prediction information collected using a worker's terminal or wearable device or residual prediction time information based on location. Also, the time-related variables may include a worker's getting-up time, a quitting time of the previous day, fixed working hours, information on whether a worker can commute autonomously, etc., and may utilize information about a worker's action, an alarm time, motion detection, toilet usage, etc. collected through a worker's terminal or wearable device or obtained from a workplace management system. Further, worker reservation schedule related variables may include information on a meeting, a seminar schedule, or a daily or weekly schedule, and may be collected from a workplace management system or a worker's terminal or wearable device.

Thereafter, the air conditioning device may optimize parameters of major predictive variables per building/floor/zone (S920). This process of optimizing parameters of predictive variables may derive the optimal value through on-line optimization technique or batch-type operation technique, and may utilize a combination of major predictive variables in the form of vector or matrix product.

In addition, the air conditioning device may complete predictive modeling for the commuting time of each worker, based on the collected predictive variables. The modeling may include a certain equation derived by comprehensively considering weights of the predictive variables that affect the commuting time of each worker. Using the modeling, the air conditioning device may output the predicted commuting time point for an input of the variable at the prediction time point. The output of the commuting time point will be described in detail below in FIG. 9B.

FIG. 9B shows a method for predicting the commuting time point by using the modeling generated in FIG. 9A.

The air conditioning device may extract the target persons per building/floor/zone (S940). This means selectively extracting the target at the above-described steps S650, S663 and S665 in FIG. 6B. Thereafter, the air conditioning device may collect predictive parameter values to be inputted to the modeling generated in FIG. 9A (S945). Then, the air conditioning device may extract a recently updated modeling (S950). The recently updated modeling may include, for example, a modeling updated the day before, and this extraction of recent modeling is for predicting an accurate commuting time point at the current time point. The air conditioning device may input the collected predictive variable values into the extracted modeling and then predict the commuting time point of each extracted target person (S955). Thereafter, the air conditioning device may arrange the target persons, based on the predicted commuting time point, and then derive the time point at which k % of the total persons enter the workplace and the time point at which (100−k) % of the total persons leave the workplace (S960).

The air conditioning device may utilize the derived commuting time point as the setting temperature arrival target time.

Figure 10A:
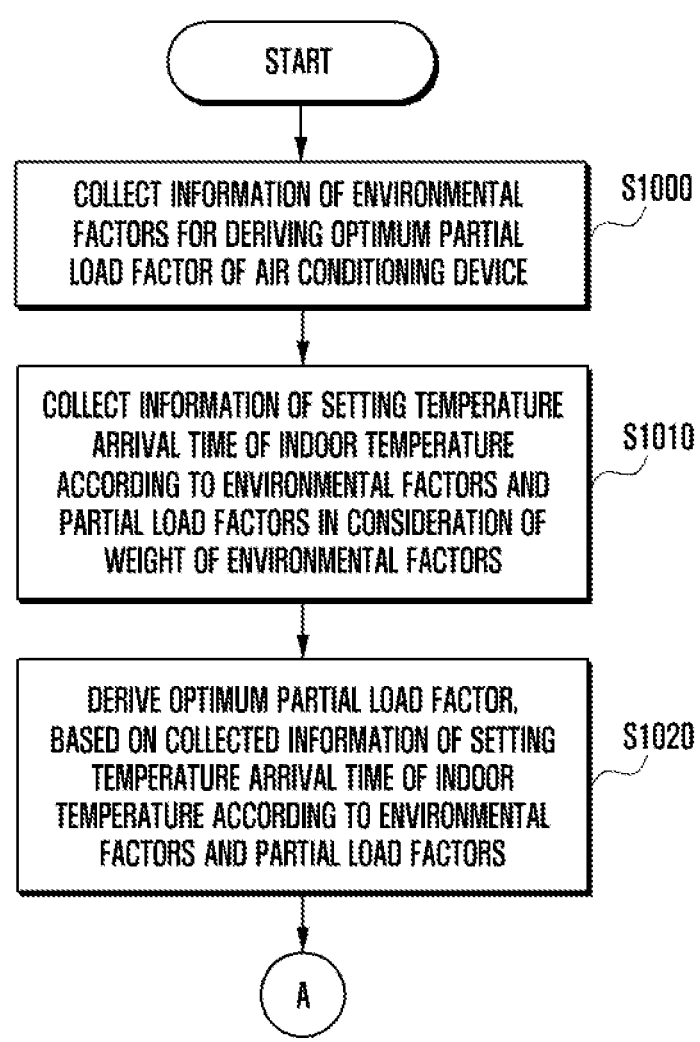
FIGS. 10A and 10B are diagrams illustrating a method for controlling a starting time in consideration of a partial load factor of an air conditioning device according to an embodiment of the present invention.
Figure 10B:
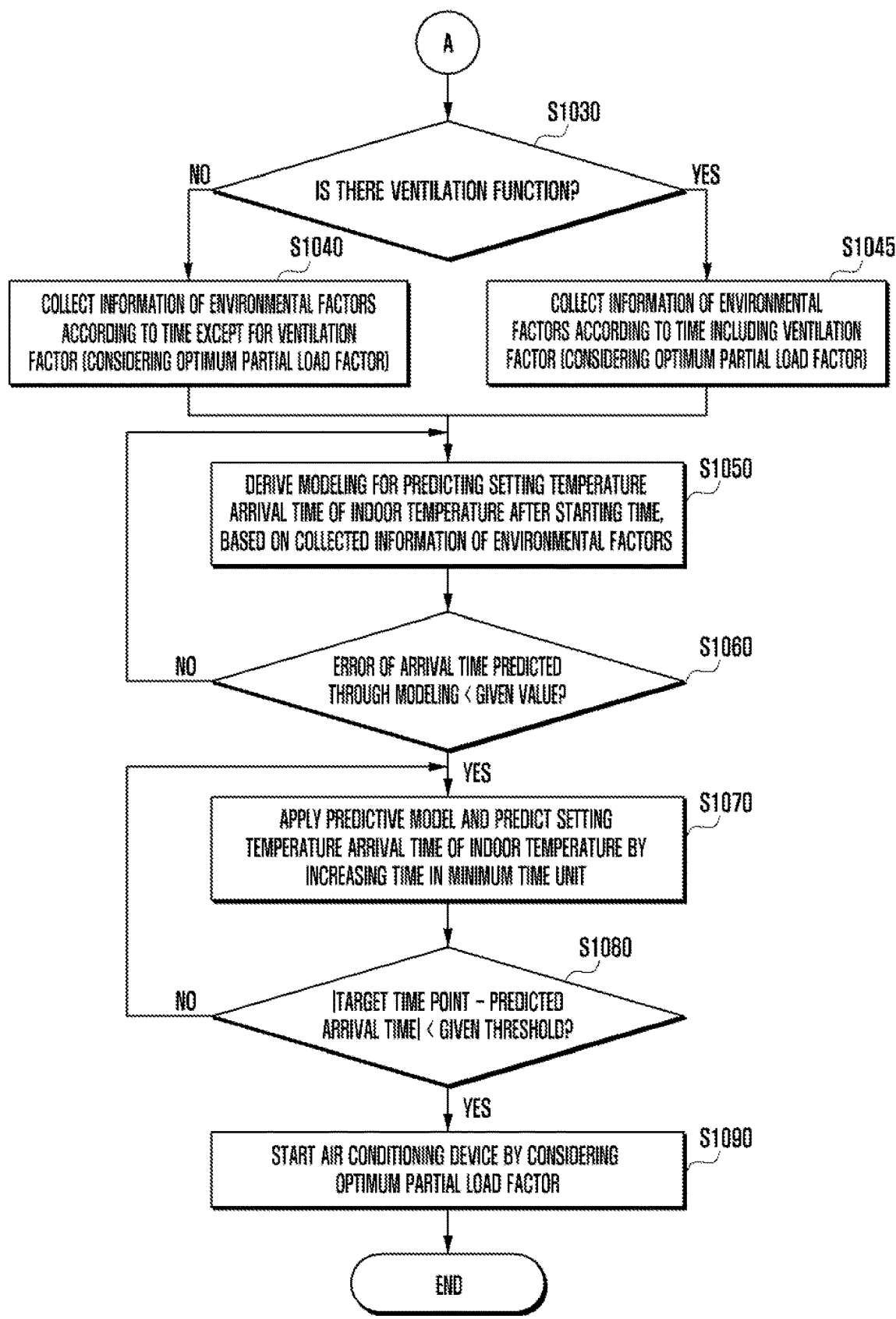

FIGS. 10A and 10B are diagrams illustrating a method for controlling a starting time in consideration of a partial load factor of an air conditioning device according to an embodiment of the present invention.

Depending on the type of the air conditioning device, partial load factors may vary. Using this, additional energy saving is possible.

At step S1000, the air conditioning device may collect information of environmental factors for deriving the optimum partial load factor thereof. This collection may include retrieving previously stored information of environmental factors from the memory of the air conditioning device. In addition, information of at least one environmental factor may be stored together with time information, and this time information may be retrieved together with information of environmental factors.

In addition, if it is determined that additional information of environmental factors is required in addition to the information of environmental factors previously stored in the memory, the air conditioning device may further acquire information of environmental factors by using the transceiver and the sensor unit. For example, in order to obtain a certain number of samples in deriving the modeling for predicting an arrival time of an indoor temperature by using information of environmental factors, the air conditioning device may further acquire the information of environmental factors.

Namely, the air conditioning device may request the external server or the administrator server to additionally provide information of environmental factors. In this case, the transceiver of the air conditioning device may receive the information of environmental factors according to time from the external server or the administrator server. Also, the air conditioning device may further acquire information of an indoor factor or the like among environmental factors from the sensor unit.

At step S1010, the air conditioning device may collect information of a setting temperature arrival time of an indoor temperature according to environmental factors and partial load factors in consideration of the weight of environmental factors. The air conditioning device may determine the weight according to the influence of the collected environmental factors upon the setting temperature arrival time of an indoor temperature. Using at least one of the environmental factors in consideration of the weight, the air conditioning device may collect the information of the setting temperature arrival time of the indoor temperature according to environmental factors and partial load factors.

At step S1020, the air conditioning device may derive the optimum partial load factor, based on the collected information of a setting temperature arrival time of an indoor temperature according to environmental factors and partial load factors. Specifically, the air conditioning device may determine whether a condition that the setting temperature arrival time of the indoor temperature is within a predetermined time limit is satisfied. Then, the air conditioning device may derive the lowest partial load factor satisfying the above condition as the optimum partial load factor according to information of environmental factors. This will be described in detail with reference to FIG. 11.

Thereafter, at step S1030, the air conditioning device may determine whether there is a ventilation function. As described above, the air conditioning device of the present invention may include various types of air conditioning device. Namely, the air conditioning device may include equipment having the system air conditioner and the ventilator as well as equipment capable of performing heating, ventilation, and air conditioning (HVAC). In this case, it is important to determine whether the ventilator is installed and whether ventilation is possible, based on environmental information and indoor information.

Therefore, the above step of determining whether there is a ventilation function may include a process of identifying the type of the air conditioning device, for example, the HVAC, equipment having both the system air conditioner and the ventilator, or equipment having only the system air conditioner. If the air conditioning device is the HVAC or has the ventilator, it may be determined that the air conditioning device has a ventilation function. If the air conditioning device has only the system air conditioner without any ventilator, it may be determined that the air conditioning device has no ventilation function.

If there is no ventilation function in the air conditioning device, the air conditioning device may collect information of environmental factors according to time except for a ventilation factor at step S1040. Namely, since there is no need to consider environmental conditions according to the ventilation factor when the air conditioning device has no ventilation function, only information of environmental factors except a ventilation factor may be collected. If the ventilator is installed in the air conditioning device, the air conditioning device may collect information of environmental factors according to time including ventilation information at step S1045. At steps S1040 and S1045, the air conditioning device may collect information of environmental factors in consideration of the optimum partial load factor. Namely, in case of some factors, e.g., an indoor temperature, influenced by the starting of the air conditioning device among the environmental factors, information thereof may be collected when the air conditioning device is started with the derived optimum partial load factor applied.

Collecting the information of environmental factors may include retrieving such information previously stored in the memory of the air conditioning device. In addition, information of at least one environmental factor may be stored together with time information, and the information of environmental factors may be retrieved together with the time information.

In addition, if it is determined that additional information of environmental factors is required in addition to the information of environmental factors previously stored in the memory, the air conditioning device may further acquire information of environmental factors by using the transceiver and the sensor unit. For example, in order to obtain a certain number of samples in deriving the modeling for predicting an arrival time of an indoor temperature by using information of environmental factors, the air conditioning device may further acquire the information of environmental factors.

Namely, the air conditioning device may request the external server or the administrator server to additionally provide information of environmental factors. In this case, the transceiver of the air conditioning device may receive the information of environmental factors according to time from the external server or the administrator server. Also, the air conditioning device may further acquire information of an indoor factor or the like among environmental factors from the sensor unit.

Hereinafter, it is assumed that the air conditioning device is placed in an environmental condition of impossible ventilation in spite of having a ventilation function. In this case, the air conditioning device collects information of environmental factors according to time including ventilation information at step S1045 because of having a ventilation function. However, because the air conditioning device does not need to use the ventilation function, the numerical value of ventilation information may be a basic value or zero. The ventilation information may include the quality of indoor air (e.g., the amount of carbon dioxide ($CO_2$)), the quality of outdoor air (e.g., the concentration of fine dust), a comparison between an indoor temperature and an outdoor temperature. In another embodiment, the air conditioning device may determine whether to further collect ventilation information at step S1045. Namely, the air conditioning device may determine whether environment allows ventilation, and if environment disallows ventilation, may assign a basic value or zero to the value of ventilation information before collecting the ventilation information.

In addition, at step S1050, the air conditioning device may derive a modeling for predicting a setting temperature arrival time of an indoor temperature after a starting time, based on the collected information of environmental factors. The modeling may include a function that defines information of at least one environmental factor as an input value and also defines a setting temperature arrival time of an indoor temperature as an output value. For example, when information of environmental factors before a time point of determining the starting of the air conditioning device is defined as an input value, the modeling information may be a function that calculates a setting temperature arrival time of an indoor temperature as an output value. The functional formula may be determined in consideration of weights of environmental factors that affect the prediction of a setting temperature arrival time of an indoor temperature.

In order to derive the modeling, the air conditioning device may use information of environmental factors generated before a unit time than a time point of determining the starting of the air conditioning device. Namely, if relying on information generated after the time point of determining the starting of the air conditioning device, the amount of information to be used by the air conditioning device becomes large. This may cause a problem of excessive load in a process of executing algorithm. In this case, it is advantageous to utilize previously stored information or real-time information, being collectable through the installed sensor, instead of information generated after the time point of determining the starting of the air conditioning device.

In addition, a process of retrieving information to derive the modeling may not require learning information that deviates from the existing starting time pattern. Namely, the above time point of determining the starting of the air conditioning device may be set as a basic time (e.g., set to 6 o'clock as in the baseline), and information of environmental factors at the basic time may be utilized for modeling. Also, in order to increase the accuracy of the modeling derived using the collected information of environmental factors, the air conditioning device may generate and use various parameters by utilizing the collected information of environmental factors. For example, using indoor and outdoor temperature/humidity included in environmental factors and combinations thereof, the air conditioning device may simulate radiation, convection, and conduction, based on heat transfer theory.

Also, as a modeling method, the air conditioning device may utilize various machine learning methods or statistical regression model methods. For example, in modeling that uses the collected information of environmental factors, the air conditioning device may use 60% of the collected information as a training set and 40% as a test set. Namely, in order to derive the modeling, the air conditioning device may use 60% of the collected information of environmental factors as an input value (i.e., information of environmental factors) and an output value (i.e., a setting temperature arrival time), and also use 40% as only an input value. Thus, the air conditioning device may improve the accuracy of modeling.

Deriving the modeling for predicting a setting temperature arrival time of an indoor temperature by collecting information of environmental factors is merely one embodiment. The present invention is not limited to the above-described embodiment, and any other embodiment is applicable by those skilled in the art.

In addition, at step S1060, the air conditioning device may determine whether an error of the setting temperature arrival time of an indoor temperature predicted by the derived modeling is equal to or less than a predetermined value. The air conditioning device may evaluate the derived modeling. To evaluate the modeling, the test set may be used. Specifically, the air conditioning device may calculate the setting temperature arrival time predicted using, as an input value, information of environmental factors generated at the time point of determining the starting of the air conditioning device in the derived modeling. Then, the air conditioning device may calculate an error by comparing the predicted setting temperature arrival time with the time at which an indoor temperature actually reaches a setting temperature. For determining whether the calculated error is equal to or less than a predetermined value, the air conditioning device may use a mean bias error (MBE) (%), an absolute mean bias error (AMBE) (%), an error mean (minute), an error standard deviation, and the like.

If the error of the setting temperature arrival time of an indoor temperature predicted by the modeling exceeds the predetermined value, the air conditioning device may return to step S1050 and derive again the modeling for predicting the setting temperature arrival time of an indoor temperature after a starting time, based on the collected information of environmental factors. In this case, the air conditioning device may derive the modeling by using a larger number of samples. In this case, the air conditioning device may derive the modeling that has a reduced error and increases the accuracy in predicting the arrival time.

If the error of the setting temperature arrival time of an indoor temperature predicted by the modeling is equal to or less than the predetermined value, the air conditioning device may apply the derived modeling and predict the setting temperature arrival time of an indoor temperature by increasing a time in the minimum time unit at step S1070. Namely, in a cycle of a sensing time step (e.g., one minute interval), which is the minimum time unit, from a basic time point (e.g., 6 o'clock), the air conditioning device may determine whether to start the air conditioning device. At the time point of determining whether to start the air conditioning device, the air conditioning device may predict the setting temperature arrival time of an indoor temperature. When determining whether to start the air conditioning device in a cycle of the minimum time unit from the basic time point, the basic time point may be referred to as a first time point, and the time point of the next cycle may be referred to as a second time point. As described above, the air conditioning device may calculate the setting temperature arrival time of an indoor temperature by using, as an input value, the information of environmental factors before the time point of determining the starting of the air conditioning device.

Thereafter, at step S1080, the air conditioning device may determine whether a difference between a target time point and a predicted arrival time point (i.e., a difference between a setting temperature arrival target time and the sum of the time point of determining whether to start the air conditioning device and the predicted setting temperature arrival time) is less than a given threshold. At this time, the air conditioning device may use the setting temperature arrival time of an indoor temperature predicted at the basic time point (i.e., the first time point).

For example, if it is assumed that the basic time point is six o'clock, the target time point is eight o'clock, and the setting temperature arrival time of an indoor temperature predicted at the basic time point is 1 hour and 30 minutes, the air conditioning device may determine whether 30 minutes corresponding to a difference between 8:00 (the target time point) and 7:30 (the predicted arrival time point) is shorter than the given threshold. The given threshold may be predefined by a manufacturer of the air conditioning device and stored in the memory of the air conditioning device, or may be determined by an administrator or a user.

If the above difference in time is equal to or greater than the given threshold, the air conditioning device may return to step S1070 and predict the setting temperature arrival time of an indoor temperature by applying the modeling predicted at the time point of the next cycle. Thereafter, the air conditioning device performs the operation of step S1080. By repeating steps S1070 and S1080, the air conditioning device may improve the accuracy of predicting the starting time of the air conditioning device such that an indoor temperature can reach a setting temperature at a specific time point targeted by the user or the administrator.

If the above difference in time is less than the given threshold, the air conditioning device may control the starting thereof at step S1090, based on the optimum partial load factor. Namely, the air conditioning device may be started to conform the optimum partial load factor derived at steps S1010 to S1030. Thus, the energy saving effect according to the optimum partial load factor may be further obtained.

Since the air conditioning device includes various types in the present invention, controlling the starting of the air conditioning device may include, for example, starting the HVAC, starting the system air conditioner included in the air conditioning device, and starting simultaneously both the system air conditioner and the ventilator included in the air conditioning device.

In the present invention, if the air conditioning device has a ventilation function, the air conditioning device may determine and control the starting time of the air conditioning device in consideration of a ventilation factor. Namely, by considering environmental changes due to the ventilation factor, the air conditioning device of the present invention may solve a problem of wasting the energy consumption of the air conditioning device due to unnecessarily early starting. Also, in case of an air conditioning device that includes the system air conditioner and the ventilator separately, this air conditioning device may start the ventilator by considering environmental factors even after the starting operation.

In addition, FIGS. 10A and 10B merely illustrate one embodiment of the operation for controlling the starting of the air conditioning device by considering the ventilation factor and the partial load factor in addition to the environmental factors. It will be apparent to those skilled in the art that other modified embodiments based on the technical idea of the present invention are possible in addition to the above-discussed embodiment disclosed in FIGS. 10A and 10B. Such modified embodiments may include altering the order of steps shown in the drawing.

Figure 11A:
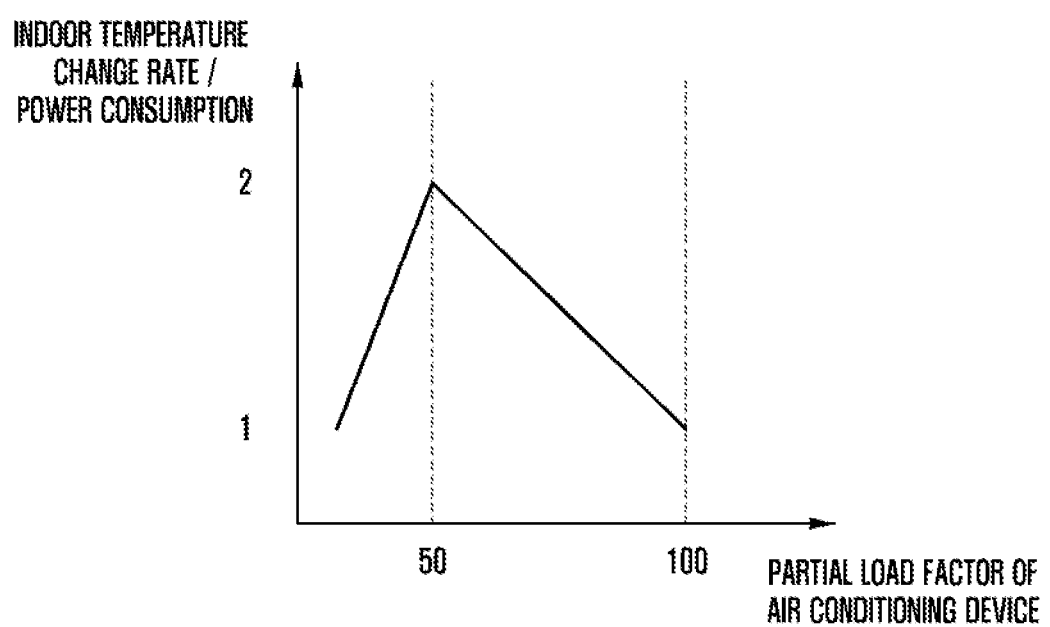
FIGS. 11A, 11B, and 11C are diagrams illustrating the efficiency according to a partial load factor of an air conditioning device and also illustrating a scheme of deriving the optimum partial load factor according to an embodiment of the present invention.
Figure 11B:
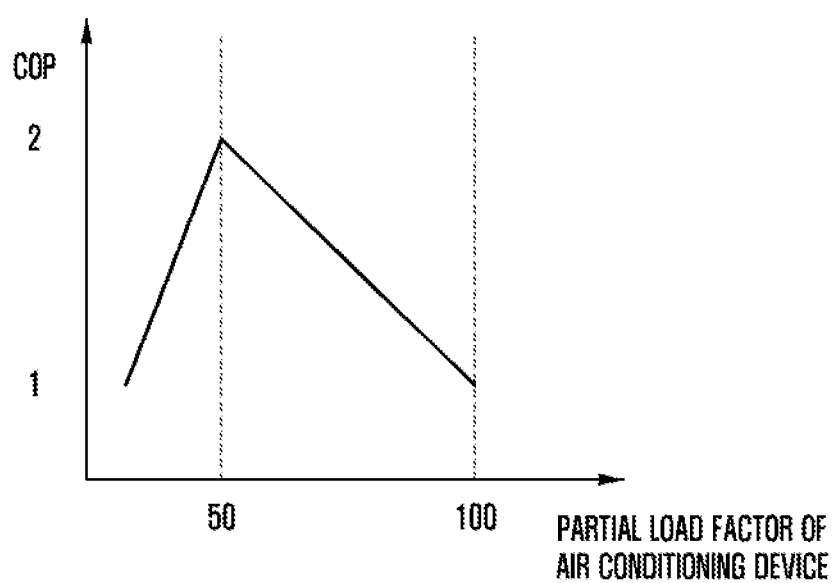
Figure 11C:
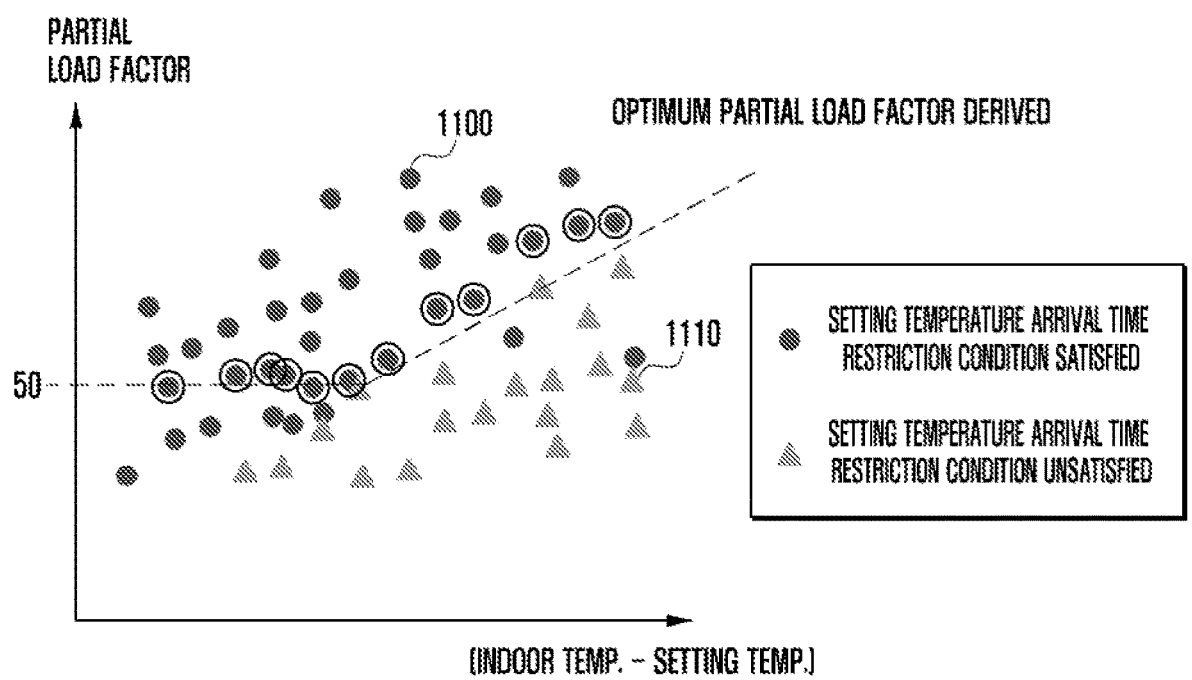

FIGS. 11A, 11B, and 11C are diagrams illustrating the efficiency according to a partial load factor of an air conditioning device and also illustrating a scheme of deriving the optimum partial load factor according to an embodiment of the present invention.

Specifically, FIG. 11A is a diagram showing a relationship between the partial load factor of the air conditioning device and an indoor temperature change rate per power consumption (indoor temperature change rate/power consumption). The value of an indoor temperature change rate per power consumption corresponds to the cooling capacity, which may indicate the efficiency of the air conditioning device. FIG. 11B shows a graph of a relationship between the coefficient of performance (COP) and the partial load factor of a normal inverter type variable refrigerant flow (VRF) for calculating the optimum partial load factor according to an embodiment of the present invention, and this graph is obtained based on FIG. 11A. The following description will be given on the assumption that the air conditioning device includes the system air conditioner and the ventilator separately. This is, however, merely one embodiment of the present invention and not to be construed as a limitation of the present invention. Those skilled in the art may apply modification of this embodiment to other embodiments.

Referring to FIG. 11B, the coefficient of performance (COP) of the air conditioning device is changed according to the partial load factor of the air conditioning device. The COP may be calculated by the following Equation 2.

$$\text{Efficiency (COP)} = \text{cooling and heating capacity (kWh)/power consumption (kWh)} \quad \text{Equation 2}$$

The cooling and heating capacity means the maximum amount of power capable of starting the air conditioning device, and the power consumption means the amount of power actually consumed by the air conditioning device. The unit of the cooling and heating capacity and the power consumption is kWh.

In FIG. 11B, when the partial load factor is 100%, namely, when the air conditioning device is operated at the maximum value and has a full load, the efficiency (COP) 1. In contrast, when the partial load factor is 50%, the efficiency (COP) is 2. Therefore, the efficiency is doubled when the partial load factor is 50%. Namely, this means that in case of having the same cooling and heating capacity, the power consumption at the partial load factor 50% is half in order to derive the same cooling and heating effect.

When the partial load factors are 100% and 50%, the power to be consumed to achieve the same cooling effect is as follows. For example, a cooling situation will be described on the assumption that it is not a problem that the indoor temperature reaches the setting temperature at the target time (1 hour) even if the partial load factor is reduced to 50% through the current limit control. If the cooling capacity is 1000 kWh, the partial load factor of 100% corresponds to the efficiency of 1, and thus the power consumption of 1000 kWh is required. In contrast, when the partial load factor is 50%, the efficiency is 2, and thus the power consumption of 250 kWh is required at the cooling capacity of 500 kWh. In addition, when the partial load factor is 50%, it should be considered that energy is consumed for twice a time so as to obtain the same cooling effect. Since the power consumption for one hour is 500 kWh in case of the partial load factor of 100% and 250 kWh in case of the partial load factor of 50%, the power consumption per hour at 100% is twice the power consumption per hour at 50%.

In the above, the case of restricting the partial load factor of the air conditioning device to 50% through the current limit control is explained, but other cases of restricting the partial load factor of the air conditioning device to 80% or the like may also be applied.

FIG. 11C is a diagram for explaining a method for calculating the optimum partial load factor, based on one of predictive model factors according to an embodiment of the present invention.

FIG. 11C is a graph showing a method for deriving the minimum partial load value for the current limit control. Specifically, when there is a restriction condition for the setting temperature arrival time of the indoor temperature, the air conditioning device may determine whether the restriction condition is satisfied while gradually lowering the partial load factor from the highest value (100) at the basic starting time (e.g., six o'clock). Namely, the air conditioning device may monitor whether any unsatisfied situation occurs.

In this case, various graphs may be drawn based on at least one of factors that are used importantly for predicting the setting temperature arrival time of the indoor temperature. The air conditioning device may assign the weights to a plurality of environmental factors according to the degree of influence on the setting temperature arrival time. This is the operation of the air conditioning device previously described at steps S1110 to S1130. Namely, by considering the degree of influence on the setting temperature arrival time of the indoor temperature according to changes of information of collected environmental factors, the weights of the collected environmental factors may be determined. In this case, the above-described environmental factors may be used independently or in combination (e.g., a difference between the setting temperature and the indoor temperature). The factor utilized in FIG. 11C is a difference between the setting temperature and the indoor temperature. This is merely one embodiment, and other environmental factors may be used depending on the above-mentioned weights.

As shown in FIG. 11C, the air conditioning device may determine whether a predetermined restriction condition for the setting temperature arrival time is satisfied according to variations in the environmental factors and the partial load factor. FIG. 11C distinctively shows instances 1100 of satisfying the restriction condition for the setting temperature arrival time and instances 1110 of unsatisfying the restriction condition for the setting temperature arrival time. In this case, the optimum partial load factor may be determined as the lowest limit of the partial load factor that can achieve the highest efficiency of the air conditioning device. Namely, even if the difference between the setting temperature and the indoor temperature is not large, the partial load factor capable of achieving the highest efficiency may be restricted to be not considered. FIG. 11C shows that the partial load factor of 50% or less is not considered since the partial load factor capable of achieving the highest efficiency is 50% as previously discussed in FIG. 11B. Then, based on the graph, the air conditioning device may derive the partial load factor of the lowest value that satisfies the restriction condition according to the environmental factors. The air conditioning device may store the derived partial load factor of the lowest value as the optimum partial load factor according to the information of the environmental factors.

Thereafter, the air conditioning device may add the optimum partial load factor to the environmental factors to be collected to derive the modeling for predicting the setting temperature arrival time of the indoor temperature. In addition, the air conditioning device may make a set of information combined with the environmental factor information used when deriving the optimum partial load factor. When predicting the setting temperature arrival time of the indoor temperature by using the optimum partial load factor, the air conditioning device may obtain additional energy saving effect in comparison with case of considering no partial load factor. The operation of predicting the setting temperature arrival time by using the optimum partial load factor is as previously described in FIGS. 10A and 10B.

Figure 12:
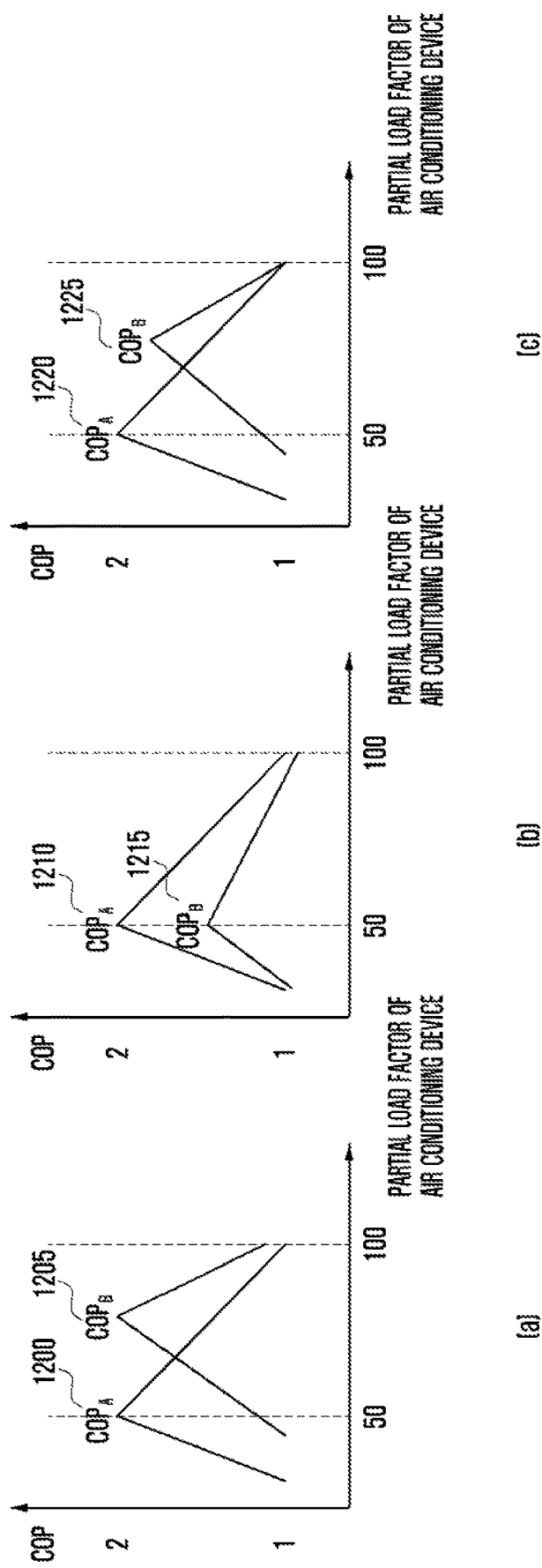
FIG. 12 is a diagram illustrating a method for controlling a partial load factor to derive the optimum efficiency at the time of starting a plurality of air conditioning devices according to an embodiment of the present invention.

FIG. 12 is a diagram illustrating a method for controlling a partial load factor to derive the optimum efficiency at the time of starting a plurality of air conditioning devices according to an embodiment of the present invention.

Specifically, FIG. 12 illustrates an embodiment in which several system air conditioners exist within a certain area. The system air conditioner may include one outdoor unit and at least one indoor unit, and may be operated by adjusting the partial load factor of the outdoor unit. When there are several system air conditioners in a certain area, the system air conditioners A and B may have different efficiencies according to the partial load factor. Now, a method for deriving the partial load factor of each system air conditioner for deriving the optimum efficiency will be described.

Parts (a), (b) and (c) of FIG. 12 show cases in which different kinds of system air conditioners have different efficiencies for the partial load factor. Namely, part (a) shows a case where the highest partial load factor differs between the system air conditioners A and B, part (b) shows a case where the highest efficiency differs at the same partial load factor, and part (c) shows a case where both the highest partial load factor and the highest efficiency differ.

In general, the sum of COPs may be calculated by Equation 3 below. Using Equation 3, the values of x and y for outputting the optimum COP may be derived.

$$\text{Total } COP = \alpha * \frac{\text{Capacity}_A}{\text{Total Capacity}} * COP_A(x_A) + \beta * \frac{\text{Capacity}_B}{\text{Total Capacity}} * COP_B(x_B).$$

Equation 3

In Equation 3, $\text{Capacity}_A$ and $\text{Capacity}_B$ denote the number of indoor units connected to the system air conditioner A and the number of indoor units connected to the system air conditioner B, respectively, which exist in a certain area. Total Capacity represents the sum of CapacityA and CapacityB. In addition, the $COP_A$ ($x_A$) and $COP_B$ ($x_B$) show respective graphs shown in FIG. 12, namely, a graph in which partial load factors $x_A$ and $x_B$ are used as input values and $COP_A$ and $COP_B$ are used as output values.

Normally, it is difficult to exactly obtain the COP graph. Therefore, this may be estimated using a temperature change rate per unit power as described above. At this time, in calculating the total COP of different kinds of devices in order to obtain the optimum partial load factor, the highest value rates of the COPA (x) and COPB (x), namely, the rates α and β of the highest efficiency values, are reflected. Therefore, as in case of the same kind of devices, the optimization problem may be solved through data collection. Namely, in the respective air conditioning devices, the partial load factors $x_A$ and $x_B$ for outputting the optimum COP may be derived using Equation 3.

Figure 13A:
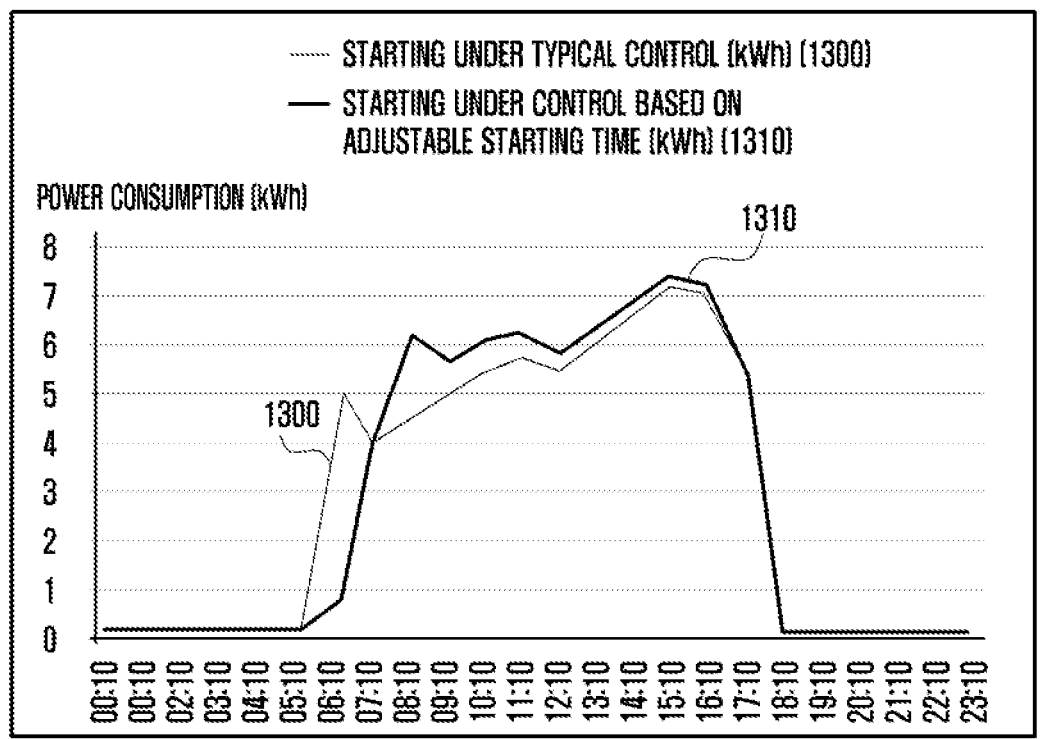
FIGS. 13A and 13B are diagrams illustrating the effect of a method for controlling a starting time of an air conditioning device according to an embodiment of the present invention.
Figure 13B:
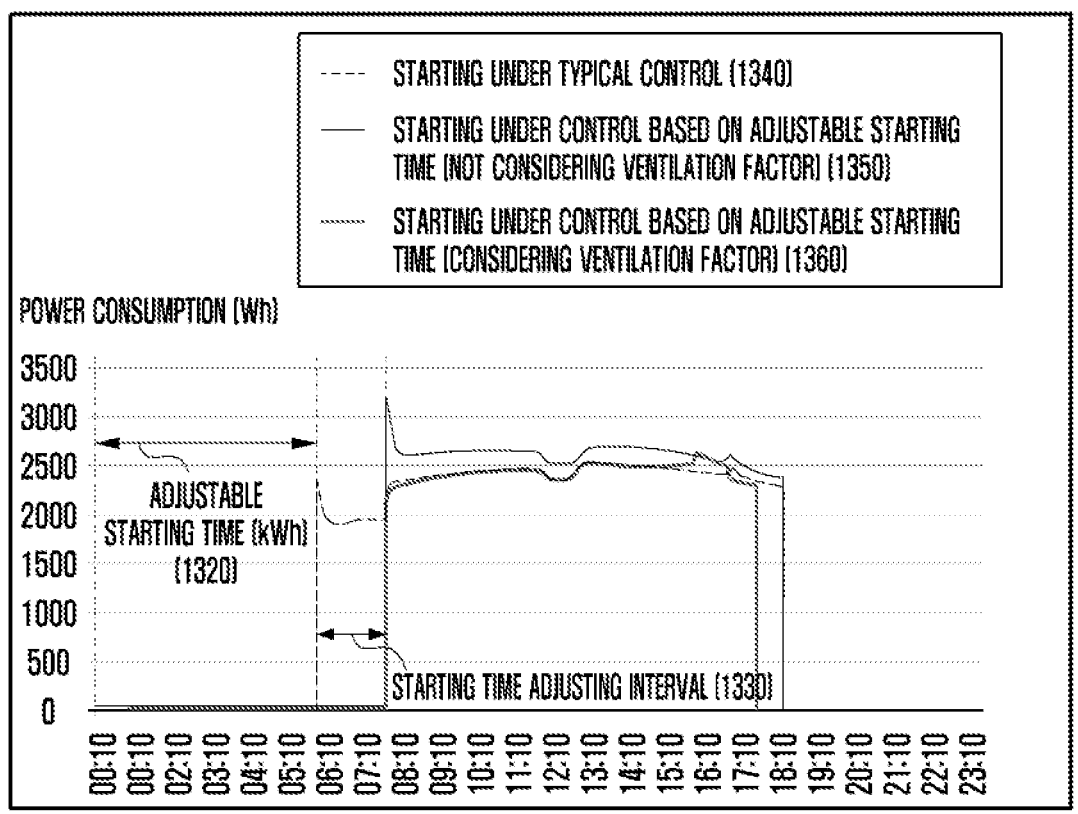

FIGS. 13A and 13B are diagrams illustrating the effect of a method for controlling a starting time of an air conditioning device according to an embodiment of the present invention.

Specifically, FIG. 13A is a graph of power consumption compared between a case 1300 of starting under typical control and a case 1310 of starting under control based on adjustable starting time in consideration of ventilation according to an embodiment of the present invention. In this case, the area under a graph line represents the total power consumption in each case 1300 and 1310. FIG. 13B is a graph of power consumption compared among a case of starting under typical control, a case of starting under control based on adjustable starting time considering no ventilation factor, and a case of starting under control based on adjustable starting time considering a ventilation factor. Similarly, the area under a graph line represents the total power consumption in each case.

As a result of trial measurement according to an embodiment of the present invention as shown in the above-described graphs of FIGS. 13A and 13B, the power consumption is reduced in the case 1350 of starting under control based on adjustable starting time in comparison with the case 1340 of starting under typical control, and further reduced in the case 1360 of additionally considering the ventilation factor.

A typical control, which attempts to maintain the comfort level of the user by moving up the starting time without considering the environmental factors, has a problem of failing to optimize energy consumption, but the present invention can solve this problem. In addition, by operating the air conditioning device in consideration of the comfort level in a certain space and other factors, such as a heat load in the space, which affect the operation of the air conditioning device, the present invention can maintain the comfort level of the user and also solve the problem of energy waste caused by the heat load concentration or heat accumulation phenomenon.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

The invention claimed is:

1. A method for controlling starting of an air conditioning device, the method comprising:
   acquiring information on at least one environmental factor including an outdoor factor, an indoor factor, and a setting factor of the air conditioning device;
   predicting a first time point at which an indoor temperature reaches a setting temperature when the air conditioning device is operated, based on the acquired information on the at least one environmental factor;
   identifying whether a difference between a target time point and the predicted first time point is less than a threshold value; and
   determining whether to start the air conditioning device or to predict a second time point after a preset time interval elapsed after the predicting of the first time point, based on the identified result.

2. The method of claim 1, wherein the at least one environment factor further includes a ventilation factor comprising at least one of an outside air inflow ratio, a total amount of mixed air, or a change in an indoor temperature after ventilation, and at least one of the predicted time points is further based on the ventilation factor, in case that the air conditioning device has a ventilation function.

3. The method of claim 1, wherein the predicting of the first time point further comprises predicting the first time point based on a machine learning model and a statistical regression analysis model which are operated by the air conditioning device.

4. The method of claim 1, further comprising:
   determining the target time point based on distribution information about an entry time of a plurality of users for a certain space in which the air conditioning device is installed.

5. The method of claim 1, further comprising:
   determining a partial load factor, based on the acquired information on the at least one environmental factor; and
   determining to start the air conditioning device based on the predicted first time and the partial load factor.

6. The method of claim 5, further comprising:
   determining a weight according to an influence of the at least one environmental factor on a setting temperature arrival time of the indoor temperature;
   determining the partial load factor based on weighted environmental factors;
   predicting the first time point at which the indoor temperature reaches the setting temperature based on the weighted environmental factors and the partial load factor;
   calculating an optimum partial load factor, in case that the predicted first time point satisfies a predetermined restricted condition of a setting temperature reaching time; and
   determining the calculated optimum partial load factor to the partial load factor.

7. The method of claim 6, further comprising:
   calculating a partial load ratio of each of a plurality of air conditioning devices based on a number of indoor units connected to the plurality of air conditioning devices and efficiency information on the plurality of air conditioning devices, in case that the plurality of air conditioning devices installed in a specific area is controlled; and
   controlling the plurality of air conditioning devices based on the calculated partial load factor.

8. An apparatus for controlling starting of an air conditioning device, the apparatus comprising:
   a transceiver; and
   a controller configured to:
      acquire information on at least one environmental factor including an outdoor factor, an indoor factor, and a setting factor of the air conditioning device,
      predict a first time point at which an indoor temperature reaches a setting temperature when the air conditioning device is operated, based on the acquired information on at least one environmental factor,
      identify whether a difference between a target time point and the predicted first time point is less than a threshold value, and
      determine whether to start the air conditioning device or to predict a second time point after a preset time interval elapsed after the predicting of the first time point, based on the identified result.

9. The apparatus of claim 8, wherein the at least one environment factor further includes a ventilation factor comprising at least one of an outside air inflow ratio, a total amount of mixed air, or a change in indoor temperature after ventilation, and at least one of the predicted time points is further based on the ventilation factor, in case that the air conditioning device has a ventilation function.

10. The apparatus of claim 8, wherein the controller is further configured to predict the first time point based on a machine learning model and a statistical regression analysis model which are operated by the air conditioning device.

11. The apparatus of claim 8, wherein the controller is further configured to determine the target time based on distribution information about an entry time of a plurality of users for a certain space in which the air conditioning device is installed.

12. The apparatus of claim 8, wherein the controller is further configured to:
    determine a partial load factor, based on the acquired information on the at least one environmental factor, and
    determine to start the air conditioning device based on the predicted first time and the partial load factor.

13. The apparatus of claim 12, wherein the controller is further configured to:
    determine a weight according to an influence of the at least one environmental factor upon a setting temperature arrival time of the indoor temperature, and determine the partial load factor based on weighted environmental factors.

14. The apparatus of claim 13, wherein the controller is further configured to:
    predict the first time point at which the indoor temperature reaches the setting temperature based on the weighted environmental factors and the partial load factor;
    calculate an optimum partial load factor, in case that the predicted first time point satisfies a predetermined restricted condition of a setting temperature reaching time; and
    determine the calculated optimum partial load factor to the partial load factor.

15. The apparatus of claim 12, wherein the controller is further configured to:
    calculate a partial load ratio of each of a plurality of air conditioning devices based on a number of indoor units connected to the plurality of air conditioning devices and efficiency information on the plurality of air conditioning devices, in case that the plurality of air conditioning devices installed in a specific area is controlled; and
    control the plurality of air conditioning devices based on the partial load factor.

* * * * *